United States Patent [19]
Murata et al.

[11] Patent Number: 5,559,799
[45] Date of Patent: Sep. 24, 1996

[54] MODULATOR AND DEMODULATOR APPARATUS AS WELL AS MODULATION AND DEMODULATION METHOD

[75] Inventors: Hiroyasu Murata; Hideo Miyazawa; Takashi Kaku, all of Kawasaki, Japan

[73] Assignee: Fujitsu Limited, Kanagawa, Japan

[21] Appl. No.: 108,536

[22] Filed: Aug. 19, 1993

[30] Foreign Application Priority Data

Feb. 18, 1993 [JP] Japan .................... 5-029367

[51] Int. Cl.⁶ .................... H04B 1/38; H04J 1/14; H04L 27/22
[52] U.S. Cl. .................... 370/76; 370/122; 375/329
[58] Field of Search .................... 370/20, 694, 122, 370/123, 76, 110.1, 110.4; 375/8, 9, 15, 78, 79, 80, 83, 86, 39, 222, 223, 235, 322, 324, 329, 332, 340; 329/304, 345

[56] References Cited

U.S. PATENT DOCUMENTS

| | | | |
|---|---|---|---|
| 4,024,342 | 5/1977 | Croisier et al. | 375/15 |
| 4,174,489 | 11/1979 | Guidoux et al. | 375/86 |
| 4,373,151 | 2/1983 | Houdard et al. | 329/104 |
| 4,601,044 | 7/1986 | Kromer, III | 375/17 |
| 4,683,578 | 7/1987 | Betts et al. | 375/39 |
| 4,800,573 | 1/1989 | Cupo | 370/69.1 |
| 4,860,308 | 8/1989 | Kamerman et al. | 375/8 |
| 4,985,900 | 1/1991 | Rhind et al. | 375/10 |

FOREIGN PATENT DOCUMENTS 0173569  3/1986  European Pat. Off. .

*Primary Examiner*—Hassan Kizou
*Attorney, Agent, or Firm*—Staas & Halsey

[57] ABSTRACT

A modulator and demodulator apparatus for use with a network is provided. The modulator and demodulator apparatus comprises a modulation section which includes a timing phase discrimination section for receiving, as an input signal thereto, a demodulation vector signal sampled into a digital value and discriminating to which one of a plurality of regions of a discrimination plane the phase of the input signal belongs. The timing phase discrimination section supplies, as an input to a next processing stage, a rotation vector obtained by rotating an input vector, moves the rotation vector to a quadrant which includes a reference discrimination region of the discrimination plane and performs, when the vector after the movement is not in the reference discrimination region, a predetermined calculation. When the vector after the movement comes to the reference discrimination region, another calculation is performed. This discriminates a timing phase of the input vector from the result of the calculation.

35 Claims, 20 Drawing Sheets

FIG. 8(a)

SIGNAL HAVING NO PHASE LEAD/LAG

| INPUT FROM DEMODULATION PROCESSING MEANS | | $(TIMX + j \cdot TIMY)$ |
|---|---|---|
| DC2M1R | 0 | — |
| DC2M2R | 1 | $-(\frac{1}{13})^2 + j \cdot 0$ |
| DC2M1R | 0 | — |
| DC2M2R | -1 | $-(\frac{2}{13})^2 (1 + \frac{1}{2} \cdot \frac{11}{13})^2 + j \cdot 0$ |
| DC2M1R | 0 | — |
| DC2M2R | 1 | $-(\frac{2}{13})^2 (1 + \frac{11}{13} + \frac{1}{2} \cdot (\frac{11}{13})^2)^2 + j \cdot 0$ |
| DC2M1R | 0 | — |
| DC2M2R | -1 | $-(\frac{2}{13})^2 (1 + \frac{11}{13} + (\frac{11}{13})^2 + \frac{1}{2} \cdot (\frac{11}{13})^3)^2 + j \cdot 0$ |

FIG. 8(b)

SIGNAL HAVING PHASE LEADING BY 90°

| INPUT FROM DEMODULATION PROCESSING MEANS | $\times \sqrt{2}$ | $(TIMX + j \cdot TIMY)$ |
|---|---|---|
| DC2M1R | 1 | — |
| DC2M2R | 1 | $0 - j \cdot \frac{1}{13}$ |
| DC2M1R | -1 | — |
| DC2M2R | -1 | $0 - j \cdot (\frac{2}{13})^2 (1 + \frac{1}{2} \cdot \frac{11}{13})^2$ |
| DC2M1R | 1 | — |
| DC2M2R | 1 | $0 + j (\frac{2}{13})^2 (1 + \frac{11}{13} + \frac{1}{2} \cdot (\frac{11}{13})^2)^2$ |
| DC2M1R | -1 | — |
| DC2M2R | -1 | $0 - j \cdot (\frac{2}{13})^2 (1 + \frac{11}{13} + (\frac{11}{13})^2 + \frac{1}{2} \cdot (\frac{11}{13})^3)^2$ |

TIMING PHASE DISCRIMINATION
EQUIVALENT CIRCUIT (BASIC)

FIG. 10(a) IBUS

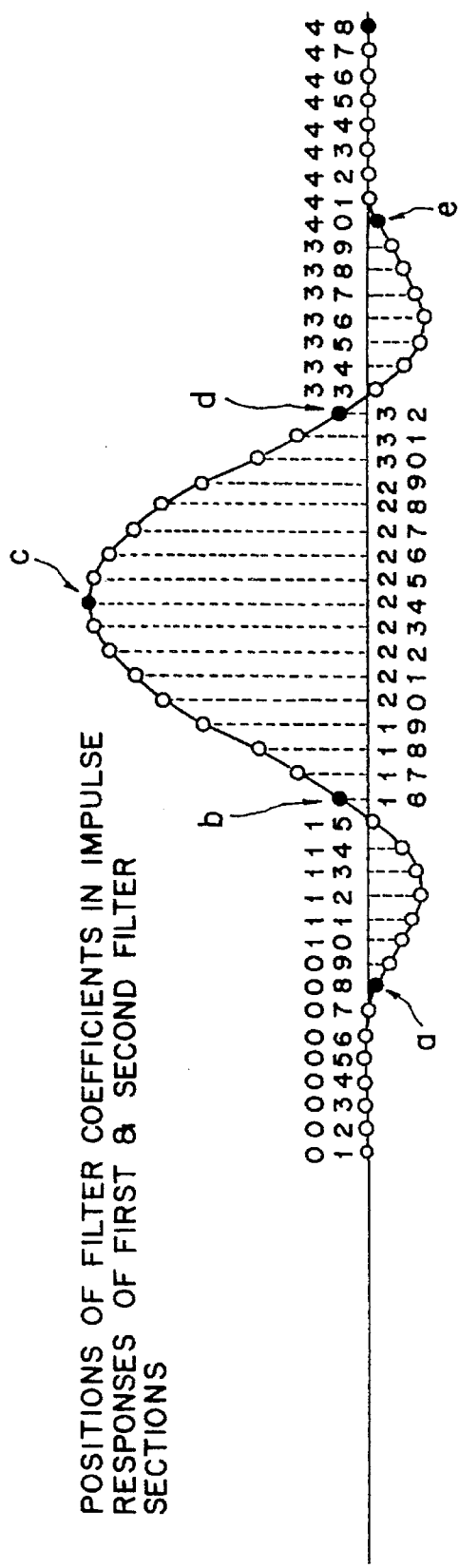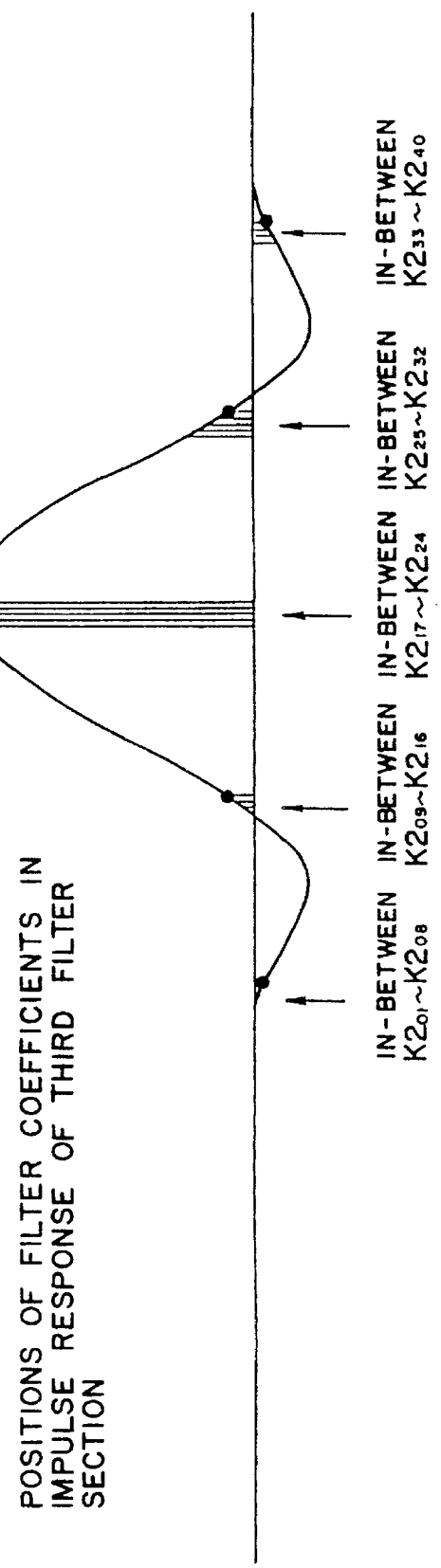
FIG. 12(a)
POSITIONS OF FILTER COEFFICIENTS IN IMPULSE RESPONSES OF FIRST & SECOND FILTER SECTIONS
FIG. 12(b)
POSITIONS OF FILTER COEFFICIENTS IN IMPULSE RESPONSE OF THIRD FILTER SECTION

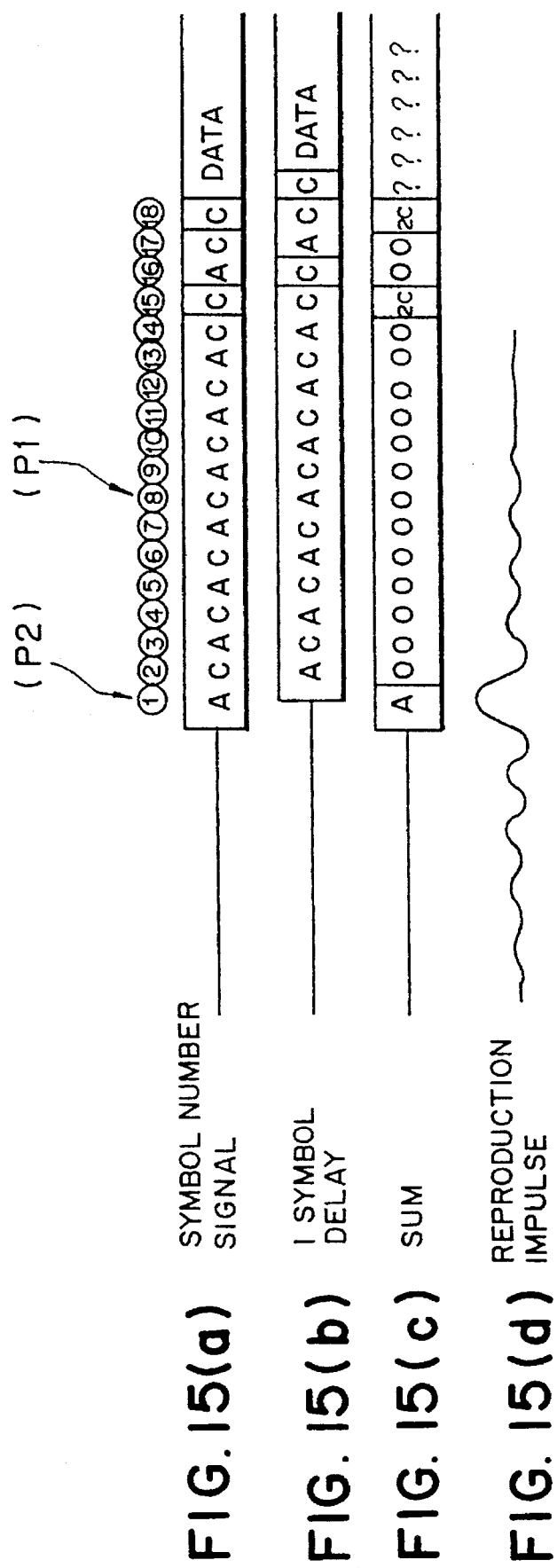

MODULATOR AND DEMODULATOR APPARATUS AS WELL AS MODULATION AND DEMODULATION METHOD

BACKGROUND OF THE INVENTION

This invention relates to a modulator and demodulator apparatus as well as a modulation and demodulation method suitable for use with a network.

Modulator-demodulator apparatus (modems) are used widely for transmission of data in analog circuits which use a voice band.

Modems use a main channel for transmitting main data of a terminal or a like apparatus, and a secondary channel for transmitting data for supervision of a network such as signal quality information and a receive level, for example, to a network supervisory apparatus for supervising the network in a centralized condition.

Since a main channel and a secondary channel are provided by frequency division, network supervisory data can be transmitted without influencing main data. Therefore, when a problem occurs, rapid recovery and disconnection of the problem portion can be realized.

Meanwhile, modems employ, as a modulation and demodulation method, frequency shift keying (FSK) for the secondary signal and phase shift keying (PSK), quadrature amplitude modulation (QAM) or some other method for the main signal. Modems employ, as a communication method, a start-stop communication method for the secondary channel and a synchronizing communication method for the main channel.

Since the communication method in each of the main channel and the secondary channel is different, the modulation and demodulation operations of the two channels cannot be performed integrally, but are performed completely separately from each other. Consequently, a large amount of the hardware is required, and the apparatus cannot be reduced in size.

Accordingly, a modulator and demodulator apparatus is needed wherein modulation and demodulation operations for a main channel and a secondary channel are performed integrally so that the hardware construction can be reduced in size without reduction of communication efficiency.

Also a modulator and demodulator apparatus is needed wherein a main channel is divided into a plurality of main channels so that the modulator and demodulator apparatus can modulate and demodulate data of the main channels and a secondary channel obtained by frequency division and can be connected to a plurality of terminals.

Incidentally, modems of the phase shift keying type employ such a technique as described below for a reception section thereof.

In particular, the reception section includes a timing phase discrimination circuit for discriminating the timing phase of a receive signal. The timing phase discrimination circuit receives a vector signal as a timing signal having a real component and an imaginary component after being sampled into a digital value, and discriminates the timing phase of the input vector signal depending upon which one of several divisional discrimination regions of a discrimination plane the phase of the input signal belongs.

Referring to FIG. 19, a block diagram of a phase discrimination circuit is shown. The phase discrimination circuit shown employs, for example, such a discrimination plane 200 as shown in FIG. 17 wherein it is divided into 10 divisional discrimination regions 201 to 210.

In particular, an input vector is rotated by 0°, −36°, −72°, ... and −324°. Then, the vectors thus rotated are individually moved to the first quadrant. Then, based on the angle of rotation of that vector which belongs to the region (reference discrimination region) 201 after having moved to the first quadrant as described above, the number of the region to which the vector originally belongs is output.

The phase discrimination circuit shown in FIG. 19 has functions which can be represented by a plurality of timing phase discrimination units 320A to 320J provided by a number equal to the number of discrimination regions of the discrimination plane 200 and a discrimination section 325.

The timing phase discrimination units 320B to 320J include rotation sections 321B to 321J for rotating an input vector by respective desired angles, quadrant movement sections 322B to 322J each for moving the thus rotated vector to the first quadrant, angle calculation sections 323B to 323J each for calculating the angle of the vector moved to the first quadrant, and timing phase preceding stage processing sections (timing phase preceding stage processing means) 224B to 224J each for outputting a first value when the vector thus moved does not belong to the reference discrimination region of the discrimination plane and outputting a second value when the vector moved belongs to the reference discrimination region of the discrimination plane.

Further, in the reception section, a result of such timing phase discrimination is supplied to a roll-off filter to optimally correct the phase of the digitally sampled timing signal.

However, to provide a modulator and demodulator apparatus wherein modulation and demodulation operations for a main channel and a secondary channel are integrally performed and another modulator and demodulator apparatus wherein a plurality of main channels are used and data of the main channels and a secondary channel obtained by frequency division can be modulated and demodulated, reduction of memory capacity of the signal reception section of the modulator and demodulator apparatus and improvement of the reception processing algorithm for preventing deterioration of communication efficiency is required.

In particular, in such as phase discrimination circuit as described above, as seen in FIG. 19, to calculate in advance values of an input vector obtained when the input vector is rotated by 0°, −36°, −72°, ... and −324° and determine whether the vector thus rotated belongs to the reference discrimination region 201 of the discrimination plane 200, values of sinθ and cosθ of the rotational angle θ must be stored in memory. This also applied to a result of discrimination with regard to the discrimination region of the discrimination plane 200.

Accordingly, the portion of the memory which can be commonly used is small. Consequently, the memory capacity necessary for realization of an intended result is large, which requires a correspondingly large amount of hardware for the apparatus.

Further, since a roll-off filter for use by a main data reception section of a modem which employs a main channel divided into a plurality of channels must necessarily have a steep filter characteristic, the roll-off (ROF) ratio is set low. However, if phase jumping is performed using a filter having such a low ROF ratio, then the memory for storing coefficients must have a very large capacity. It is difficult to realize such memory capacity.

For example, where a roll-off filter of the double sampling type having 123 taps is employed, the memory capacity of a coefficient ROM (read only memory) necessary for performing phase jumping of 128 phases is given by the following equation (1):

$$123 \text{ taps} \times 128/2 = 7.872 \text{ words} \quad (1)$$

Further, although a sample signal is corrected optimally by the roll-off filter part, depending upon the form of a reception (demodulation) signal having a short training pattern such as a signal, for example, of a fast polling modem, data cannot be fetched appropriately, and the communication efficiency may deteriorate.

SUMMARY OF THE INVENTION

It is an object of the present invention to provide a modulator and demodulator apparatus and a modulation and demodulation method wherein a memory employed in a phase discrimination circuit of a reception section has a reduced capacity while adopting a same modulation and demodulation method for a main channel and a secondary channel.

It is another object of the present invention to provide a modulator and demodulator apparatus and a modulation and demodulation method wherein a memory for coefficients necessary for performing phase jumping has a reduced capacity.

It is further object of the present invention to provide a modulator and demodulator apparatus and a modulation and demodulation method which prevents deterioration of the communication efficiency arising from a form of a signal wherein the training pattern is short.

To attain the objects described above, according to an aspect of the present invention, there is provided a modulator and demodulator apparatus wherein a signal is communicated in a main channel for main data and a secondary channel for secondary data obtained by frequency division. The modulator and demodulator apparatus of the present invention comprises a modulation part modulating and transmitting main data and secondary data, and a demodulation part receiving and demodulating a receive signal to reproduce main data and secondary data. The demodulation part of the present invention includes a timing phase discrimination part receiving, as an input signal thereto, a demodulation vector signal sampled into a digital value and discriminating to which one of a plurality of regions of a discrimination plane the phase of the input signal belongs. The timing phase discrimination part of the present invention inputs, as an input for processing of a next processing stage, a rotation vector obtained by rotating the input vector, moves the rotation vector to a quadrant which includes a reference discrimination region of the discrimination plane; performs, when the vector after the movement is not in the reference discrimination region of the discrimination plane, a predetermined calculation, but performs, when the vector after movement comes to the reference discrimination region of the discrimination plane, another calculation; and discriminates a timing phase of the input vector from the result of the calculation.

The timing phase discrimination part includes a number of timing phase discrimination units equal to the number of discrimination regions of the discrimination plane, and a discrimination part applying a predetermined calculation to outputs of the timing phase discrimination units and discriminating a time phase of the input vector from a result of the predetermined calculation. Each of the timing phase discrimination units includes an input vector rotation part rotating the input vector, a quadrant movement part moving the vector rotated by the input vector rotation part to the first quadrant, an angle calculation part calculating angles of the vector moved to the first quadrant by the quadrant movement part, and timing phase discrimination preceding stage processing parts each for outputting a first value when the vector moved by a corresponding one of the quadrant movement part is not on the reference discrimination plane but outputting a second value when the vector comes to the reference discrimination region of the discrimination plane, and an output of the input vector rotation part of each of the timing phase discrimination units is used as an input to an adjacent one of the timing phase discrimination units at the preceding stage.

In this instance, each of the timing phase discrimination preceding stage processing parts outputs one of two binary values when the angle of the vector moved by a corresponding one of the quadrant movement parts is not on the reference discrimination region of the discrimination plane, but outputs the other one of the two binary values when the vector comes to the reference discrimination region of the discrimination plane. The discrimination part may add outputs of the timing phase discrimination preceding stage processing parts of the timing phase discrimination units and discriminate a timing phase of the input vector from a result of the addition.

Alternately, the demodulation part may include a main data demodulation part digitally demodulating the receive signal to reproduce main data of the main channel, and a secondary data demodulation part digitally demodulating the receive signal to reproduce secondary data of the secondary channel. The timing phase discrimination part of the secondary data demodulation part inputs, as an input for processing of a next processing stage, a rotation vector obtained by rotating the input vector, moves the rotation vector to a quadrant which includes a reference discrimination region of the discrimination plane, performs, when the vector after the movement is not in the reference discrimination region of the discrimination plane, a predetermined calculation, but performs, when the vector after movement comes to the reference discrimination region of the discrimination plane, another calculation, and discriminates a timing phase of the input vector from the result of the calculation.

According to another aspect of the present invention, a modulator and demodulator apparatus is provided wherein a signal is communicated in a main channel for main data and a secondary channel for secondary data obtained by frequency division. The modulator and demodulator apparatus of the present invention comprises a modulation part modulating and transmitting main data and secondary data, and a demodulation part receiving and demodulating a receive signal to reproduce main data and secondary data. The demodulation part includes a demodulation processing part digitally demodulating the receive signal, a digital roll-off filter part applying band separation processing to the digital demodulation signal from the demodulation processing part, and a timing phase extraction part extracting a timing phase from the digital demodulation signal from the demodulation processing part, and a timing phase discrimination part for discriminating a timing phase from the timing phase extracted by the timing phase extraction means. The demodulation part further includes a timing phase jumping digital control filter part provided at a preceding stage to roll-off filter part and jumping the timing phase by an amount in accordance with a result of timing phase discrimination from the timing phase discrimination part.

The demodulation part may include a main data demodulation part digitally demodulating the receive signal to reproduce main data of the main channel, and a secondary data demodulation part digitally demodulating the receive signal to reproduce secondary data of the secondary channel. Each of the main data demodulation part and the secondary data demodulation part includes the demodulation processing part, the digital roll-off filter part, the timing phase extraction part and the timing phase discrimination part. The timing phase jumping digital control filter part is provided at the preceding stage to the roll-off filter part only of the main data demodulation part.

According to a further aspect of the present invention, there is provided a modulator and demodulator apparatus wherein a signal is communicated in a plurality of main channels for a plurality of main data and a secondary channel for secondary data obtained by frequency division. The modulator and demodulator apparatus of the present invention comprises a modulation part modulating and transmitting main data and secondary data, and a demodulation part receiving and demodulating a receive signal to reproduce a plurality of main data and secondary data. The demodulation part includes a plurality of main data demodulation parts equal in numbers to the number of main channels and digitally demodulating the receive signal to reproduce main data of the main channels, and a secondary data demodulation part digitally demodulating the receive signal to reproduce secondary data of the secondary channel. Each of the main data demodulation parts and the secondary data demodulation part include a demodulation processing part digitally demodulating the receive signal, a digital roll-off filter part applying band separation processing to the digital demodulation signal from the demodulation part, a timing phase extraction part extracting a timing phase from the digital demodulation signal from the demodulation processing part, and a timing phase discrimination part discriminating a timing phase from the timing phase extracted by the timing phase extraction part. The demodulation part further includes a timing phase jumping digital control filter part provided at a preceding stage to the roll-off filter part of each of the main data demodulation part, and jumping the timing phase by an amount in accordance with a result of timing phase discrimination from the timing phase discrimination part of the main data demodulation part.

Each of the timing phase jumping digital control filter parts may include a plurality of timing phase jumping digital control filter sections having different timing phase jumping amounts.

The sampling frequency of the timing phase jumping digital control filter parts may be set to twice the modulation rate of the modulator and demodulator apparatus.

The timing phase jumping amount of one of the digital control filter sections which has the greatest timing phase jumping amount may be set to 180°.

The timing phase jumping amount of one of the digital control filter sections which has the ith greatest timing phase jumping amount may be set to $180°/2^N$, i being a natural number, N being $(i-1) \times n$, n being a natural number.

Each of the roll-off filter part and the timing phase jumping digital control filter part may be formed as a filter having a cosine square characteristic.

The demodulation part may further include an initialization part for initializing the roll-off filter part using data in the past before a training signal added to the top of the receive signal is received by the demodulation part.

The initialization part may include a delay tap part storing a signal sampled into a digital value for a plurality of symbols, and digital control filter means for calculating an optimum phase difference of the sample signal in the past using an output of the delay tap part.

The initialization part may further include a selection part interposed between the delay tap part and the digital control filter part selecting part of a plurality of outputs of the delay tap part and inputting the selected output or outputs of the delay tap part to the digital control filter part.

The digital control filter part may include a plurality of digital control filter sections having different jump amounts.

Each of the plurality of digital control filter sections may include a plurality of digital control filter elements disposed in parallel to each other.

The filter coefficient information used by each of the digital control filter sections of the initialization part and the filter coefficient information used by each of the digital control filter sections of the timing phase jumping digital control filter part may be common to each other.

Each of the digital control filter parts of the roll-off filter part, the timing phase jumping digital control filter part and the initialization part may be constructed as a filter having a cosine square characteristic.

According to a still further aspect of the present invention, there is provided a modulator and demodulator apparatus wherein a signal is communicated in a plurality of main channels for a plurality of main data and a secondary channel for secondary data obtained by frequency division. The modulator and demodulator apparatus of the present invention comprises a modulation part modulating and transmitting main data and secondary data, and a demodulation part receiving and demodulating a receive signal to reproduce a plurality of main data and secondary data. The demodulation part includes a plurality of main data demodulation parts equal in number to the number of main channels and digitally demodulating the receive signal to reproduce main data of the main channels, and a secondary data demodulation part digitally demodulating the receive signal to reproduce secondary data of the secondary channel. Each of the main data demodulation parts include a demodulation processing part digitally demodulating the receive signal, a digital roll-off filter part applying band separation processing to the digital demodulation signal from the demodulation processing part, a timing phase extracting part extracting a timing phase from the digital demodulation signal from the demodulation processing part, a timing phase discrimination part discriminating a timing phase from the timing phase extracted by the timing phase extraction part, and a timing phase jumping digital control filter part jumping the timing phase by an amount in accordance with a result of timing phase discrimination from the timing phase discrimination part. The secondary data demodulation part includes a timing phase discrimination part receiving, as an input signal thereto, a demodulation vector signal sampled into a digital value and discriminating to which one of a plurality of regions of a discrimination plane the phase of the input signal belongs, the timing phase discrimination part inputs, as an input for processing a next processing stage, a rotation vector obtained by rotating the input vector, moves the rotation vector to a quadrant which includes a reference discrimination region of the discrimination plane, performs, when the vector after the movement is not in the reference discrimination region of the discrimination plane, predetermined calculation, but performs, when the vector after movement comes to the reference discrimination region of the discrimination plane, another calculation, and discriminates a timing phase of the input vector from the result of the calculation.

According to a further aspect of the present invention, there is provided a modulation and demodulation method for modulating and transmitting data by a modulation part and demodulating a receive signal by a demodulation part to reproduce such data. The demodulation part receives, as an input signal, a demodulation vector signal sampled into a digital value, rotates the demodulation vector signal and uses the thus rotated demodulation vector signal as an input for next processing, moves the rotated vector to a quadrant which includes a reference discrimination region of the discrimination plane, performs predetermined calculation when the vector after being moved is not in the reference discrimination region of the discrimination plane but performs a different calculation when the vector after being moved comes to the reference discrimination region of the discrimination plane, and determines a timing phase of the input vector from a result of the calculation.

According to still a further aspect of the present invention, there is provided a modulation and demodulation method for modulating and transmitting data by a modulation part and demodulating a receive signal by a demodulation part to reproduce such data. The demodulation part jumps, at a stage preceding to a digital roll-off filter part which processes a signal obtained by digital demodulation of a receive signal by band separation processing, a timing phase by an amount based on a result of determination of a timing phase.

With the modulator and demodulator apparatus of the present invention, the following effects or advantages can be achieved.

1. The memory capacity for coefficients necessary for phase jumping can be reduced, and consequently, miniaturization of the apparatus can be realized.
2. The capacity of the memory used for the phase discrimination circuit of the reception section can be reduced, and consequently, miniaturization of the apparatus can be realized.
3. Deterioration of the efficiency in transmission and reception can be prevented irrespective of the type of a signal such as a signal wherein the training signal is short.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIGS. 8(a) and 8(b) are tables illustrating an example of timing phase extraction information from the timing phase extraction section;

FIGS. 10(a), 10(b) and 10(c) are diagrammatic views showing constructions of bit information as main side timing phase discrimination information used in the modem shown in FIG. 5;

FIGS. 12(a) and 12(b) are waveform diagrams showing positions of filter coefficients in impulse responses of the timing phase jumping digital control filter section shown in FIG. 11;

FIGS. 15(a), 15(b), 15(c) and 15(d) are diagrams illustrating operation of the initialization section shown in FIG. 14;

FIG. 19 is a block diagram showing a phase discrimination circuit.

DESCRIPTION OF THE PREFERRED EMBODIMENTS

Prior to description of a preferred embodiment of the present invention, the principles of the present invention will be described first.

Figure 1:
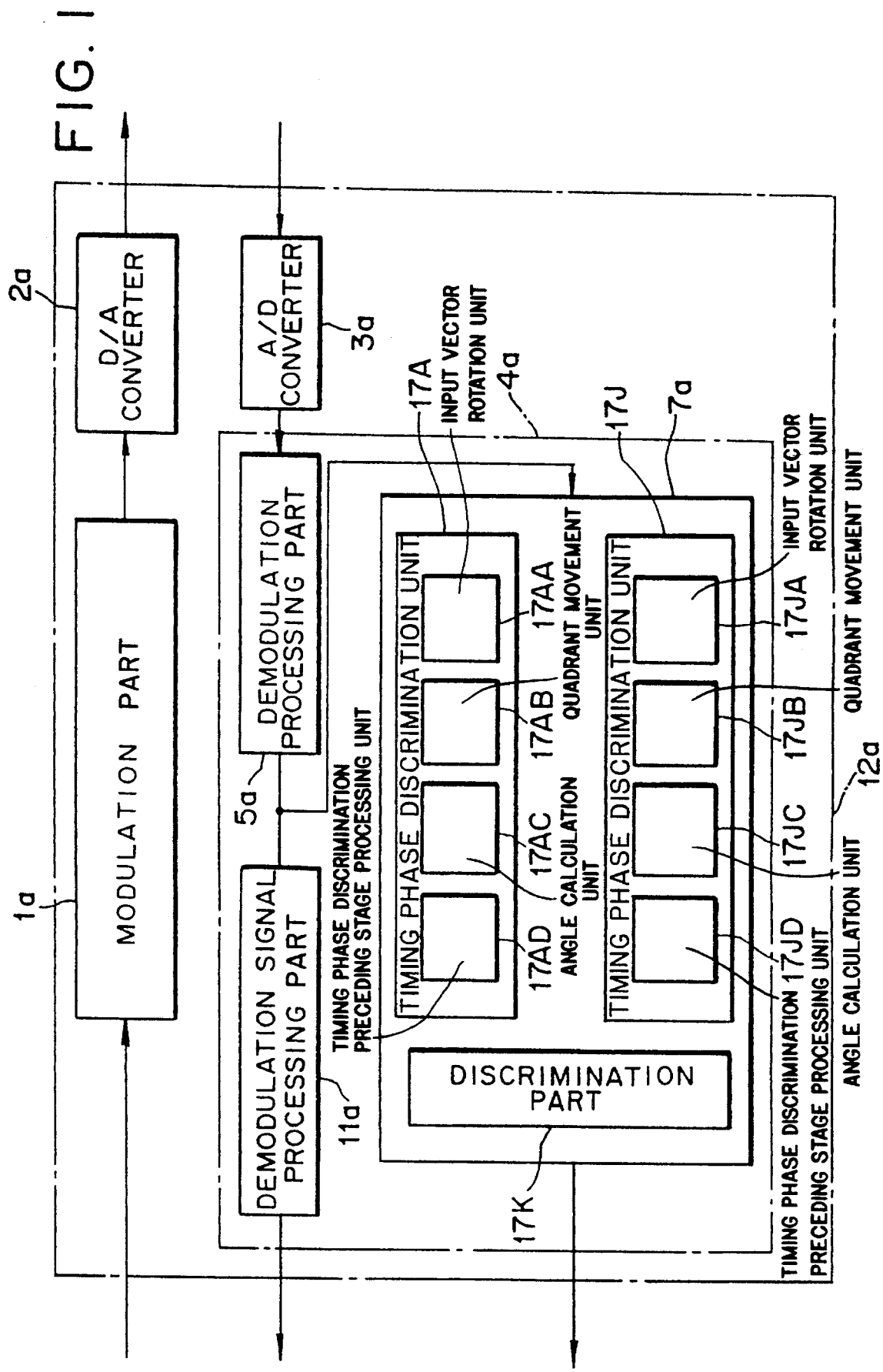
FIGS. 1 and 2 are block diagrams illustrating different principles of the present invention.

FIG. 1 is a block diagram illustrating the principle of a modulator and demodulator apparatus to which the present invention is applied. Referring to FIG. 1, the modulator and demodulator apparatus shown is generally denoted at 12a and is generally constructed such that main data and secondary data are modulated and transmitted respectively in a main channel for main data and a secondary channel for secondary data obtained by frequency division. A receive signal is demodulated to reproduce such main data and secondary data. The modulator and demodulator apparatus 12a comprises a modulation part 1a, a D/A (digital to analog) converter 2a, an A/D (analog to digital) converter 3a, and a demodulation part 4a.

The modulation part 1a modulates and transmits main data and secondary data, and the D/A converter 2a converts a digital signal in the modulator and demodulator apparatus 12a into an analog signal and outputs the analog signal into an analog transmission line.

Meanwhile, the A/D converter 3a converts a receive signal from the analog transmission line into a digital signal to allow subsequent demodulation processing in the modulator and demodulator apparatus 12a. The demodulation part 4a demodulates the receive signal to reproduce main data and secondary data.

The demodulation part 4a includes a demodulation processing part processing a receive signal by digital demodulation processing. Accordingly, the output signal of the demodulation processing part 5a is a demodulation signal sampled into a digital value. Such a demodulation signal may hereinafter be referred to as a demodulation vector signal or a digital demodulation signal.

The demodulation part 4a further includes a timing phase discrimination part 7a which receives, as an input signal thereof, a demodulation vector signal sampled into a digital value and discriminates to which one of a plurality of divisional regions of a discrimination plane the phase of the input signal belongs.

The timing phase discrimination part 7a inputs, as an input for processing of a next processing stage, a rotation vector obtained by rotating the input vector, moves the rotation vector to a quadrant which includes a reference discrimination region of a discrimination plane, performs, when the vector after the movement is not in the reference discrimination region, a predetermined calculation, but performs, when the vector after the movement comes to the reference discrimination region, another calculation, and discriminates the timing phase of the input vector from the result of the calculation.

The demodulation part 4a further includes a demodulation signal processing part 11a which performs predetermined signal processing for a demodulation signal for which digital demodulation processing has been performed by the demodulation processing part 5a and outputs the thus processed signal to reproduce main data or secondary data.

In the modulator and demodulator apparatus of the present invention, the timing phase discrimination part 7a includes a plurality of timing phase discrimination units 17A to 17J equal in number to the number (for example, 10) of the regions of the discrimination plane, and a discrimination part 17K. In this example, since the discrimination plane has "10" regions, these are also 10 timing phase discrimination units. However, the number of the regions of the discrimination plane may be any integral number equal to or greater than 2.

The timing phase discrimination units 17A to 17J include, taking notice of their functions, input vector rotation units 17AA to 17JA, quadrant movement units 17AB to 17JB, angle calculation units 17AC to 17JC, and timing phase discrimination preceding stage processing units 17AD to 17JD, respectively.

The input vector rotation units 17AA to 17JA rotate an input vector, and the quadrant movement units 17AB to 17JB move the vector rotated by the input vector rotation units 17AA to 17JA to the first quadrant, respectively. The angle calculation units 17AC to 17JC calculate the angles of the vector rotated by the quadrant movement units 17AB to 17JB, respectively.

Each of the timing phase discrimination preceding stage processing units 17AD to 17JD outputs a first value when the vector calculated by the corresponding angle calculation units 17AC to 17JC is not in the reference discrimination region of the discrimination plane, but outputs a second value when the vector comes to the reference discrimination region of the discrimination plane.

Meanwhile, the discrimination part 17K applies a predetermined calculation to the outputs of the timing phase discrimination units 17A to 17J and discriminates the timing phase of the input vector from a result of the calculation.

Then, the output of the input vector rotation units 17AA to 17JA of each of the timing phase discrimination units 17A to 17J is used as an input to an adjacent one of the timing phase discrimination units 17A to 17J at the preceding stage to it.

In the modulator and demodulator apparatus of the present invention, each of the timing phase discrimination preceding stage processing units 17AD to 17JD outputs one of two binary values when the angle of the vector calculated by the corresponding angle calculation units 17AC to 17JC is not in the reference discrimination region of the discrimination plane, but outputs the other one of the two binary values when the vector comes to the reference discrimination region of the discrimination plane. The discrimination part 17K may add the outputs of the timing phase discrimination preceding stage processing units 17AD to 17JD of the timing phase discrimination units 17A to 17J and discriminates the timing phase of the input vector from a result of the addition.

Meanwhile, in the modulator and demodulator apparatus of the present invention, the demodulation part 4a of the modulator and demodulator apparatus described above may include a main data demodulation part and a secondary data demodulation part.

The main data demodulation part digitally demodulates a receive signal to reproduce main data of the main channel, and the secondary data demodulation means digitally demodulates the receive signal to reproduce secondary data of the secondary channel.

The timing phase discrimination part of the secondary data demodulation part inputs, as an input for processing at a next processing stage, a rotation vector obtained by rotating the input vector, moves the rotation vector to a quadrant which includes a reference discrimination region of the discrimination plane, performs, when the vector after the movement is not in the reference discrimination region, a predetermined calculation, but performs, when the vector after the movement comes to the reference discrimination region, another calculation, and discriminates the timing phase of the input vector from the result of the calculation.

Figure 2:
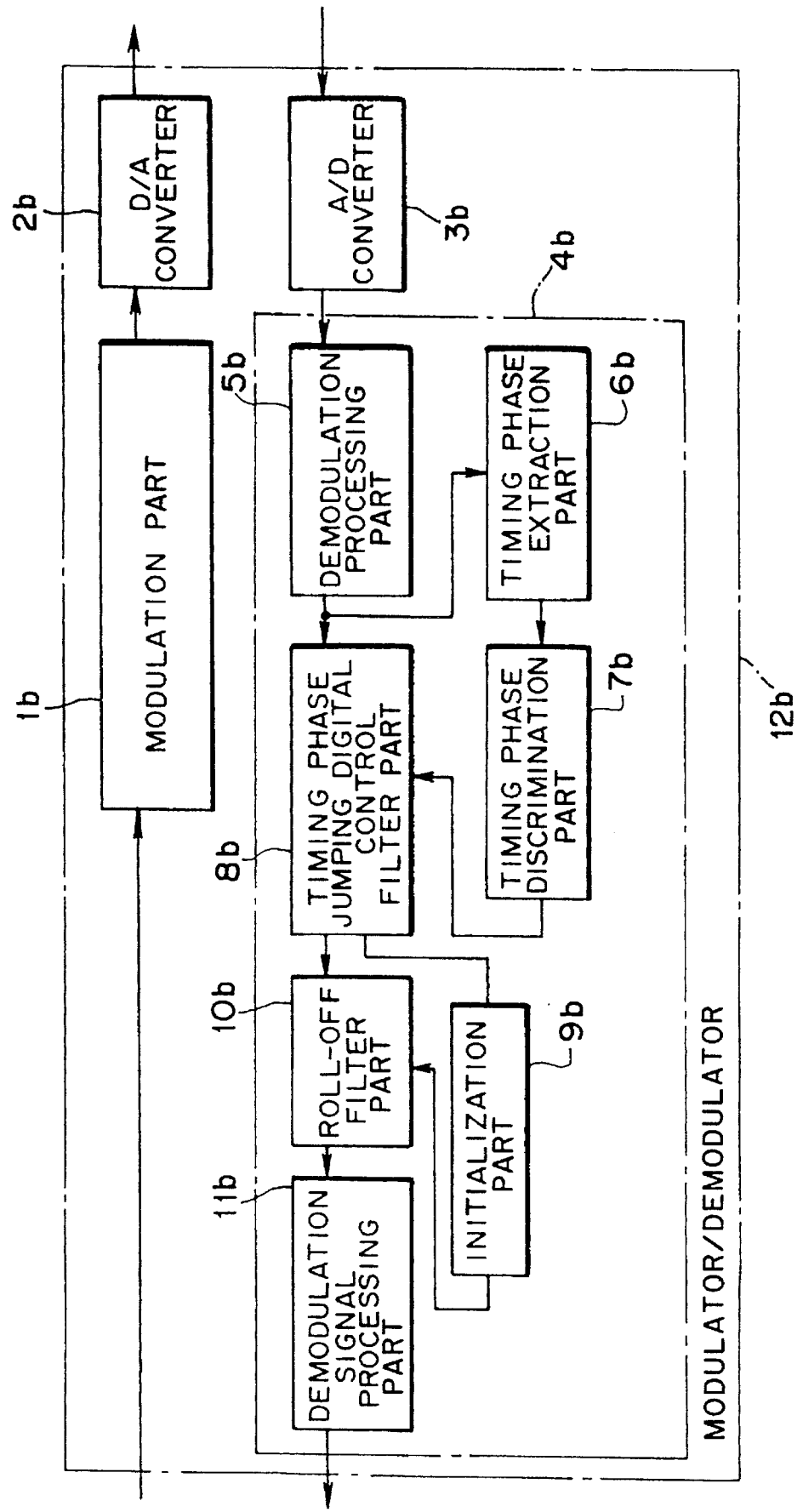

FIG. 2 is a block diagram illustrating another principle of a modulator and demodulator apparatus to which the present invention is applied. Referring to FIG. 2, the modulator and demodulator apparatus shown is generally denoted at 12b and is generally constructed such that main data and secondary data are modulated and transmitted respectively in a main channel for main data and a secondary channel for secondary data obtained by frequency division and a receive signal is demodulated to reproduce main data and secondary data. The modulator and demodulator apparatus 12b comprises a modulation part 1b, a D/A (digital to analog) converter 2b, an A/D (analog to digital) converter 3b, and a demodulation part 4b.

The modulation part 1b modulates and transmits main data and secondary data, and the D/A converter 2b converts a digital signal in the modulator and demodulator apparatus 12b into an analog signal and outputs the analog signal into an analog transmission line.

Meanwhile, the A/D converter 3b converts a receive signal from the analog transmission line into a digital signal to allow subsequent demodulation processing in the modulator and demodulator apparatus 12b, and the demodulation part 4b demodulates the receive signal to reproduce main data and secondary data.

The demodulation part 4b includes a demodulation processing part 5b processing a receive signal by digital demodulation processing. Accordingly, the output signal of the demodulation processing part 5b is a demodulation signal sampled into a digital value. Such a demodulation signal may be hereinafter referred to as a demodulation vector signal or a digital demodulation signal.

The demodulation part 4b further includes a timing phase extraction part 6b which extracts a timing phase from a digital demodulation signal from the demodulation processing part 5b.

The demodulation part 4b further includes a timing phase discrimination part 7b which discriminates a timing phase from a timing phase extracted by the timing phase extraction part 6b.

The demodulation part 4b further includes a timing phase jumping digital control filter part 8b provided at a preceding stage to roll-off filter part 10b, which will be described below, and jumps the timing phase by an amount in accordance with a result of timing phase discrimination from the timing phase discrimination part 7b.

The digital roll-off filter part 10b applies band separation processing to a digital demodulation signal from the demodulation processing part 5b.

The demodulation part 4b further includes a demodulation signal processing part 11b which performs predetermined signal processing for a demodulation signal for which digital demodulation processing has been performed by the demodulation processing part 5b and outputs the thus processed signal to reproduce main data or secondary data.

In the modulator and demodulator apparatus the demodulation part 4b may include a main data demodulation part and a secondary data demodulation part. Here, the main data demodulation part digitally demodulates a receive signal to reproduce main data of the main channel while the secondary data demodulation part digitally demodulates the receive signal to reproduce secondary data of the secondary channel.

In this instance, the timing phase jumping digital control filter part 8b is provided at the preceding stage to the roll-off filter part 10b of the main data demodulation part and jumps the timing phase by an amount in accordance with a result of timing phase discrimination from the timing phase discrimination part 7b of the main data demodulation part.

The present invention can also be applied to a modulator and demodulator apparatus wherein a signal is communicated in a plurality of main channels for a plurality of main data and a secondary channel for secondary data obtained by frequency division and main data and secondary data are modulated and transmitted by a modulation part whereas a receive signal is demodulated by a demodulation part to reproduce a plurality of main data and secondary data.

In particular, the modulator and demodulator apparatus is constructed such that the demodulation part includes a plurality of main data demodulation parts equal in number to the number of main channels and for digitally demodulating the receive signal to reproduce main data of the main channels, and a secondary data demodulation part for digitally demodulating the receive signal to reproduce secondary data of the secondary channel. Each of the main data demodulation part and the secondary data demodulation part includes a demodulation processing part digitally demodulating the receive signal, a digital roll-off filter part applying band separation processing to the digital demodulation signal from the demodulation processing part, a timing phase extraction part extracting a timing phase from the digital demodulation signal form the demodulation processing part, and a timing phase discrimination part discriminating a timing phase from the timing phase extracted by the timing phase extraction part. The demodulation part further includes a timing phase jumping digital control filter part provided at a preceding stage to the roll-off filter part of each of the main data demodulation parts and for jumping the timing phase by a desired amount in accordance with a result of timing phase discrimination from the timing phase discrimination part of the main data demodulation part.

Each of the timing phase jumping digital control filter parts of the modulator and demodulator includes a plurality of timing phase jumping digital control filter sections having different timing phase jumping amounts.

Further, in the modulator and demodulator, the sampling frequency of the timing phase jumping digital control filter part may be set to twice the modulation rate of the modulator and demodulator apparatus.

In the modulator and demodulator, the timing phase jumping amount of one of the digital control filter sections which has the greatest timing phase jumping amount may be set to 180°.

Further, in the modulator and demodulator apparatus, the timing phase jumping amount of one of the digital control filter sections which has the ith greatest timing phase jumping amount may be set to $180°/2^N$, i being a natural number, N being (i−1)×n, n being a natural member.

Each of the roll-off filter parts and the timing phase jumping digital control filter part of the modulator and demodulator apparatus is formed as a filter having a cosine square characteristic.

The demodulation part of the modulator and demodulator apparatus may further include an initialization part 9b initializing the roll-off filter part using past data before a training signal added to the top of the receive signal is received by the demodulation part.

The initialization part 9b of the modulator and demodulator apparatus may include a delay tap part storing a signal sampled into a digital value for a plurality of symbols, and a digital control filter part calculating an optimum phase value of the past sample signal using an output of the delay tap part.

The initialization part of the modulator and demodulator apparatus further includes a selection part interposed between the delay tap part and the digital control filter part for selecting part of a plurality of outputs of the delay tap part and inputting the selected output or outputs of the delay tap part to the digital control filter part.

Further, the digital control filter part of the modulator and demodulator apparatus includes a plurality of digital control filter sections having different phase jump amounts. Each of the plurality of digital control filter sections of the modulator and demodulator apparatus include a plurality of digital control filter elements disposed in parallel to each other. The filter coefficient information used by each of the digital control filter sections of the initialization part 9b and the filter coefficient information used by each of the digital control filter sections of the timing phase jumping digital control filter part 8b of the modulator and demodulator apparatus are common to each other.

Each of the digital control filter parts of the roll-off filter part 10b, the timing phase jumping digital control filter part 8b and the initialization part 9b of the modulator and demodulator is constructed as a filter having a cosine square characteristic.

On the other hand, a modulator and demodulator apparatus having a signal communicated in a plurality of main channels for a plurality of main data and a secondary channel for secondary data obtained by frequency division includes a modulation part modulating and transmitting main data and secondary data, and a demodulation part receiving and demodulating a receive signal to reproduce a plurality of main data and secondary data. The demodulation part includes a plurality of main data demodulation parts equal in number to the number of main channels and digitally demodulating the receive signal to reproduce main data of the main channels, and a secondary data demodulation part digitally demodulating the receive signal to reproduce secondary data of the secondary channel. Each of the main data demodulation parts includes a demodulation processing part for digitally demodulating the receive signal, a digital roll-off filter part applying band separation processing to the digital demodulation signal from the demodulation processing part, timing phase extraction part extracting a timing phase from the digital demodulation signal from the demodulation processing part, a timing phase discrimination part discriminating a timing phase from the timing phase extracted by the timing phase extraction part, and a timing phase jumping digital control filter part jumping the timing phase by an amount in accordance with a result of timing phase discrimination from the timing phase discrimination part. The secondary data demodulation part includes a timing phase discrimination part receiving, as an input signal thereto, a demodulation vector signal sampled into a digital value and discriminating to which one of a plurality of regions of a discrimination plane the phase of the input signal belongs. The timing phase discrimination part inputs, as an input for processing a next processing stage, a rotation vector obtained by rotating the input vector, moves the rotation vector to a quadrant which includes a reference discrimination region of the discrimination plane and performs a predetermined calculation. When the vector after the movement comes to the reference discrimination region of the discrimination plane, another calculation is performed. A timing phase of the input vector from the result of the calculation is discriminated.

When a receive signal is inputted to the modulator and demodulator apparatus by way of the analog transmission line, the A/D converter 3a converts the receive signal from an analog signal into a digital signal and outputs the digital signal to the demodulation part 4a.

Upon reception of the receive signal converted into a digital signal, the demodulation part 4a applies, at the demodulation processing part 5a thereof, digital demodulation processing to the receive signal and outputs a resultant demodulation vector signal to the timing phase discrimination part 7a and the demodulation signal processing part 11a.

The timing phase discrimination part 7a thus inputs, as an input for processing a next processing stage, a rotation vector obtained by rotating the input vector, moves the rotation vector to a quadrant which includes a reference discrimination region of the discrimination plane and performs a predetermined calculation when the vector after the movement is not in the reference discrimination region. When the vector after the movement comes to the reference discrimination region, another calculation is performed. The timing phase of the input vector from the result of the calculation is discriminated.

The demodulation signal processing part 11a, which has received the demodulation vector signal, performs predetermined signal processing for the demodulation vector signal and outputs a resultant signal to reproduce main data or secondary data. The timing phase discrimination part 7a in the modulator and demodulator which has received the demodulation vector signal, conducts discrimination of the timing phase by the following processing.

First, the input vector rotation units 17AA to 17JA rotate the demodulation vector signal as an input vector. Then, the quadrant movement units 17AB to 17JB move the vector rotated by the input vector rotation units 17AA to 17JA to the first quadrant, respectively. Further, the angle calculation units 17AC to 17JC calculate the angles of the vector rotated by the input vector rotation units 17AA to 17JA, respectively.

Then, each of the timing phase discrimination preceding stage processing units 17AD to 17JD outputs, based on a result of calculation from the corresponding one of the angle calculation units 17AC to 17JC, a first value when the vector obtained by the corresponding quadrant movement units 17AB to 17JB is not in the reference discrimination region of the discrimination plane, and outputs the second value when the vector comes to the reference discrimination region of the discrimination plane.

While such operations as described above are performed by the individual timing phase units 17A to 17J, since the output of the input vector rotation units 17AA to 17JA of each of the timing phase discrimination units 17A to 17J is used as an input to an adjacent one of the timing phase discrimination units 17A to 17J at the preceding stage to it, phase discrimination of the angle of the input vector over the whole angle is performed through processing by all of the timing phase units.

In short, the discrimination part 17K applies a predetermined calculation to the outputs of the timing phase discrimination units 17A to 17J, which are outputs of the timing phase discrimination preceding stage processing parts 17AD to 17JD, and discriminates the timing phase of the input vector from a result of the calculation.

During operation of the timing phase discrimination units 17A to 17J of the modulator and demodulator units 17A to 17J of the modulator and demodulator apparatus, each of the timing phase discrimination preceding stage processing units 17AD to 17JD outputs one of two binary values when the vector moved by the corresponding quadrant movement units 17AB to 17JB is not in the reference discrimination region of the discrimination plane. The other one of the two binary values is output when the vector comes to the reference discrimination region of the discrimination plane.

Then, the discrimination part 17K adds the outputs of the timing phase discrimination preceding stage processing units 17AD to 17JD of the timing phase discrimination units 17A to 17J and discriminates the timing phase of the input vector from an addition result.

The timing phase discrimination part of the secondary data demodulation part of the modulator and demodulator apparatus inputs, as an input for processing at a next processing stage, a rotation vector obtained by rotating the input vector, moves the rotation vector to a quadrant which includes a reference discrimination region of a discrimination plane and performs a predetermined calculation when the vector after the movement is not in the reference discrimination region. When the vector after the movement comes to the reference discrimination region, another calculation is performed and discriminates the timing phase of the input vector from the result of the calculation.

Meanwhile, when a receive signal is inputted to the modulator and demodulator apparatus shown in FIG. 2 by way of the analog transmission line, the A/D converter 3b converts the receive signal from an analog signal into a digital signal and outputs the digital signal to the demodulation part 4b. Upon receipt of the digital signal, the demodulation part 4b applies, at the demodulation processing part 5b thereof, digital demodulation processing to the receive signal and outputs a resultant demodulation vector signal to the timing phase extraction part 6b and the timing phase jumping digital control filter part 8b.

Then, the timing phase extraction part 6b extracts a timing phase from the digital demodulation signal from the demodulation part 5b and outputs the thus extracted timing phase to the timing phase discrimination part 7b. The timing phase discrimination part 7b thus discriminates a timing phase from the timing phase extracted by the timing phase extraction part 6b and outputs a result of such discrimination to the timing phase jumping digital control filter part 8b.

The timing phase jumping digital control filter part 8b jumps the timing phase of the digital demodulation signal from the demodulation processing part 5b by an amount in accordance with the result of discrimination from the timing phase discrimination part 7b.

The digital demodulation signal, whose timing phase has been jumped by the amount, is outputted to the roll-off filter part 10b, and the roll-off filter part 10b applies band separation processing to the digital demodulation signal. Thereafter, the digital demodulation signal, which has been processed by the band separation processing, undergoes desired signal processing by the demodulation signal processing part 11b so that it is outputted and reproduced from it.

Meanwhile, when the receive signal inputted by way of the analog transmission line to the modulator and demodulator apparatus includes main data of the main channel or secondary data of the secondary channel, the main data demodulation part digitally demodulates the receive signal to reproduce the main data of the main channel. Further, the secondary data demodulation part digitally demodulates the receive signal to reproduce the secondary data of the secondary channel.

In particular, when a receive signal of main data of the main channel converted into a digital signal is received, the main data demodulation part reproduces the main data by way of a processing process similar to that of the demodulation part of the modulator and demodulator apparatus described above. Further, in such a modulator and demodulator apparatus a signal is communicated in a plurality of main channels for a plurality of main data and a secondary channel for secondary data obtained by frequency division and main data and secondary data are modulated and transmitted by a modulation part. A receive signal is demodulated by a demodulation part to reproduce a plurality of main data and secondary data when a receive signal is inputted, the following demodulation processing is performed.

In short, a receive signal converted into a digital signal is digitally demodulated by the main data demodulation part provided for the individual main channels and the secondary data demodulation part so that main data of the main channels and secondary data of the secondary channel are reproduced. In particular, in each of the main data demodulation parts, the demodulation processing part applies digital demodulation processing to the receive signal and outputs a resultant digital demodulation signal to the timing phase extraction part and the timing phase jumping digital control filter part.

The timing phase extraction part thus extracts a timing phase from the digital demodulation signal from the demodulation processing part and outputs the thus extracted timing phase to the timing phase discrimination part.

The timing phase discrimination part discriminates a timing phase from the timing phase extracted by the timing phase extraction part and outputs a result of the discrimination to the timing phase jumping digital control filter part.

The timing phase jumping digital control filter part jumps the timing phase of the digital demodulation signal from the demodulation processing part by an amount in accordance with the result of discrimination from the timing phase discrimination part.

The digital demodulation signal, whose timing phase has been jumped by the amount, is outputted to the digital roll-off filter part, and the digital roll-off filter part applies band separation processing to the digital demodulation signal.

Thereafter, the digital demodulation signal, which has been processed by the band separation processing, undergoes desired signal processing by the demodulation signal processing part so that it is outputted and reproduced from it.

Meanwhile, in the secondary data demodulation means, the demodulation processing part applies digital demodulation processing to the receive signal and outputs a resulted digital demodulation signal to the roll-off filter part, and band separation processing is performed by the roll-off filter part.

Then, the signal, to which the band separation processing has been applied, is outputted to the demodulation signal part, and in the demodulation signal processing part, the signal is processed by desired signal processing so that it is outputted and reproduced from it.

Further, the timing phase extraction means extracts a timing phase from the digital demodulation signal from the demodulation processing means and outputs the thus extracted timing phase to the timing phase discrimination part. Thereafter, the timing phase discrimination part discriminates a timing phase from the timing phase extracted by the timing phase extraction part.

Timing phase jumping by each of the timing phase jumping digital control filter parts of the modulator and demodulator apparatus is performed by the plurality of timing phase jumping digital control filter sections having different timing phase jumping amounts.

Further, sampling of the timing phase jumping digital control filter part of the modulator and demodulator apparatus is performed with a frequency equal to twice the modulation rate. One of the digital control filter sections of the modulator and demodulator apparatus which has the greatest timing phase jumping amount performs timing phase jumping with the phase of 180°. Further, the digital control filter sections of the modulator and demodulator apparatus of the present invention which has the ith greatest timing phase jumping amount performs timing phase jumping with the phase of $180°/2^N$, i being a natural number, N being (i−1)×n, n being a natural number.

Meanwhile, each of the roll-off filter part and the timing phase jumping digital control filter part of the modulator and demodulator has a cosine square characteristic.

The initialization part 9b of the modulator and demodulator apparatus initializes the roll-off filter part using past data before a training signal added to the top of the receive signal is received. The delay tap part of the initialization part 9b of the modulator and demodulator apparatus stores a signal sampled into a digital value for a plurality of symbols. Then, the digital control filter part of the initialization part 9b calculates an optimum phase values of the samples signal in the past using the value of the delay tap means. The selection part of the modulator and demodulator apparatus selects part of the plurality of outputs of the delay tap part and inputs the selected output or outputs of the delay tap part to the digital control filter part.

Calculation of an optimum phase value of the past sample signal using the value of the delay tap part by the digital control filter part of the modulator and demodulator apparatus is performed by a plurality of digital control filter sections having different phase jump amounts.

Calculation of an optimum phase value of the past sample signal using the value of the delay tap part by the digital control filter means of the modulator and demodulator apparatus is performed by the plurality of digital control filter elements disposed in parallel to each other and having different phase jump amounts.

Processing by each of the digital control filter sections of the initialization part 9b and processing by each of the digital control filter sections of the timing phase jumping digital control filter part of the modulator and demodulator apparatus are performed commonly using the filter coefficient information.

Each of the digital control filter parts of the roll-off filter part, the timing phase jumping digital control filter part and the initialization part 9b of the modulator and demodulator apparatus has a cosine square characteristic.

On the other hand, a modulator and demodulator apparatus in which a signal is communicated in a plurality of main channels for a plurality of main data and a secondary channel for secondary data obtained by frequency division includes a modulation part for modulating and transmitting main data and secondary data, and a demodulation part for receiving and demodulating a receive signal to reproduce a plurality of main data and secondary data when a receive signal inputted. The following demodulation processing is performed.

In short, a receive signal converted into a digital signal is digitally demodulated by the main data demodulation part provided for the individual main channels and the secondary data demodulation part so that main data of the main channels and secondary data of the secondary channel are reproduced.

In particular, in each of the main data demodulation parts, the demodulation processing part applies digital demodulation processing to the receive signal and outputs a resultant digital demodulation signal to the timing phase extraction part and the timing phase jumping digital control filter part. The timing phase extraction part thus extracts a timing phase from the digital demodulation signal from the demodulation processing part and outputs the thus extracted timing phase to the timing phase discrimination part.

The timing phase discrimination part discriminates a timing phase from the timing phase extracted by the timing phase extraction part and outputs a result of the discrimination to the timing phase jumping digital control filter part.

The timing phase jumping digital control filter part jumps the timing phase of the digital demodulation signal from the demodulation processing means by an amount in accordance with the discrimination result from the timing phase discrimination part. The digital demodulation signal, whose timing phase has been jumped by the above amount, is outputted to the digital roll-off filter part, and the digital roll-off filter part applies band separation processing to the digital demodulation signal.

Thereafter, the digital demodulation signal, which has been processed by band separation processing, undergoes desired signal processing by the demodulation signal processing part so that it is outputted and reproduced from it.

Meanwhile, in the secondary data demodulation part, when the receive signal converted into a digital signal is received, the demodulation processing part first applies digital demodulation processing to the receive signal and outputs a resultant digital demodulation vector signal to the timing phase discrimination part and the demodulation signal processing part.

Thereafter, the timing phase discrimination part inputs, as an input for processing at a next processing stage, a rotation vector obtained by rotating the input vector, moves the rotation vector to the quadrant which includes the reference discrimination region of the discrimination plane and performs a predetermined calculation when the vector after the movement is not in the reference discrimination region. When the vector after the movement comes to the reference discrimination region another calculation is performed. The timing phase of the input vector is discriminated from the result of the calculation. Meanwhile, the demodulation signal processing part, which as received the demodulation vector signal, processes the demodulation vector signal by desired processing and outputs it to reproduce the secondary data.

As described in detail above, with the modulator and demodulator apparatus of the present invention, the following effects or advantages can be achieved.

1. The memory capacity for coefficients necessary for phase jumping can be reduced, and consequently, miniaturization of the apparatus can be realized.
2. The capacity of the memory used for the phase discrimination circuit of the reception section can be reduced, and consequently, miniaturization of the apparatus can be realized.
3. Deterioration of the efficiency in transmission and reception can be prevented irrespective of the type of a signal such as a signal wherein the training signal is short.

Figure 3:
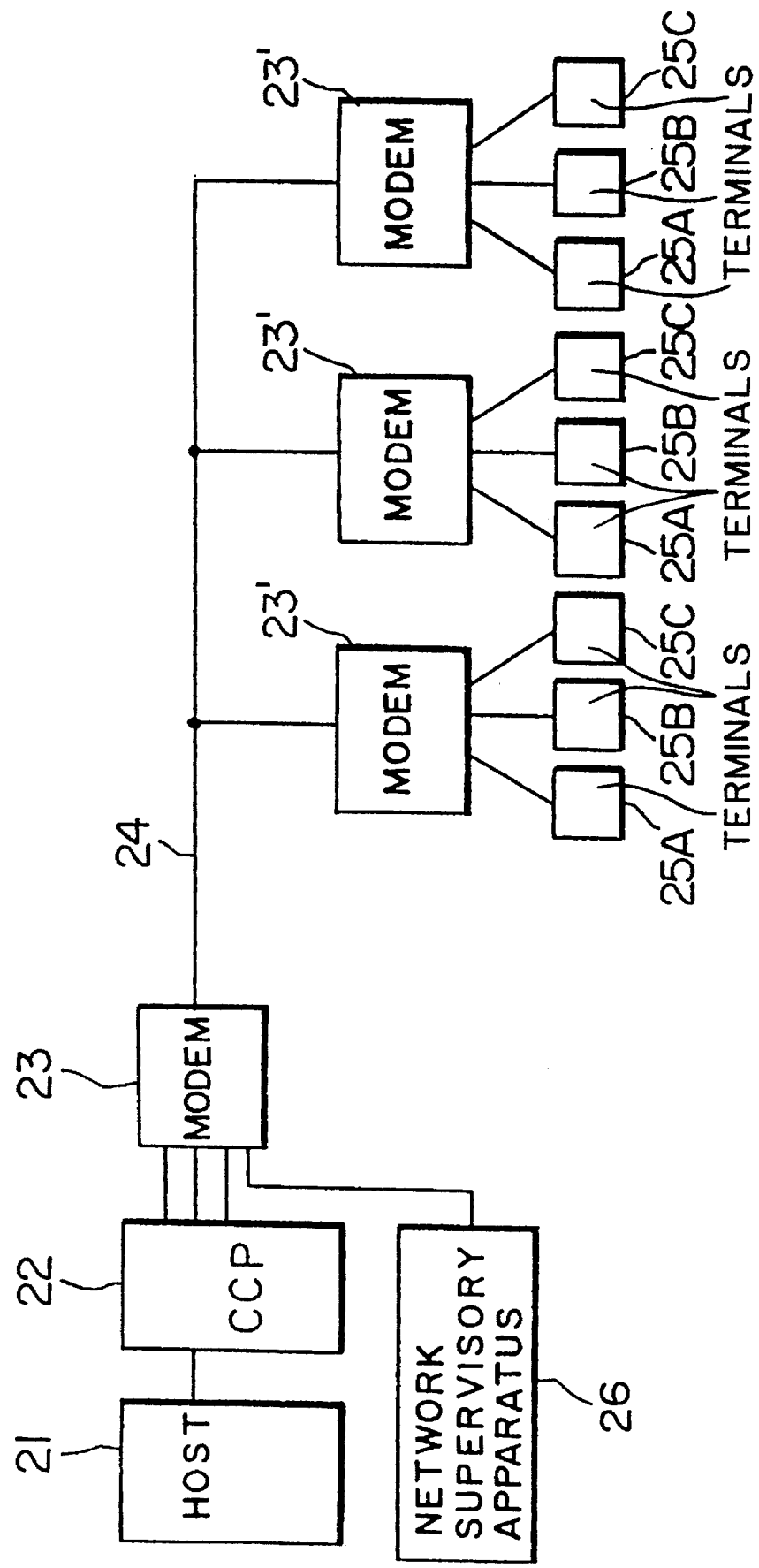
FIG. 3 is a block diagram of an on-line system to which the present invention is applied.

A preferred embodiment of the present invention is now described in detail. Referring first to FIG. 3, there is shown an on-line system to which the present invention is applied. The on-line system shown includes a modem 23 connected to a host computer 21 by way of a communication control apparatus (CCP) 22 and serving as a parent situation. A plurality of modems 23' are connected to the modem 23 by way of an analog circuit 24. The modems 23' are installed at different locations from the modem 23 and each serves as a child station. A plurality of terminals 25A to 25C are connected to each modem 23'. The on-line system further includes a network supervisory apparatus 26.

Figure 6:
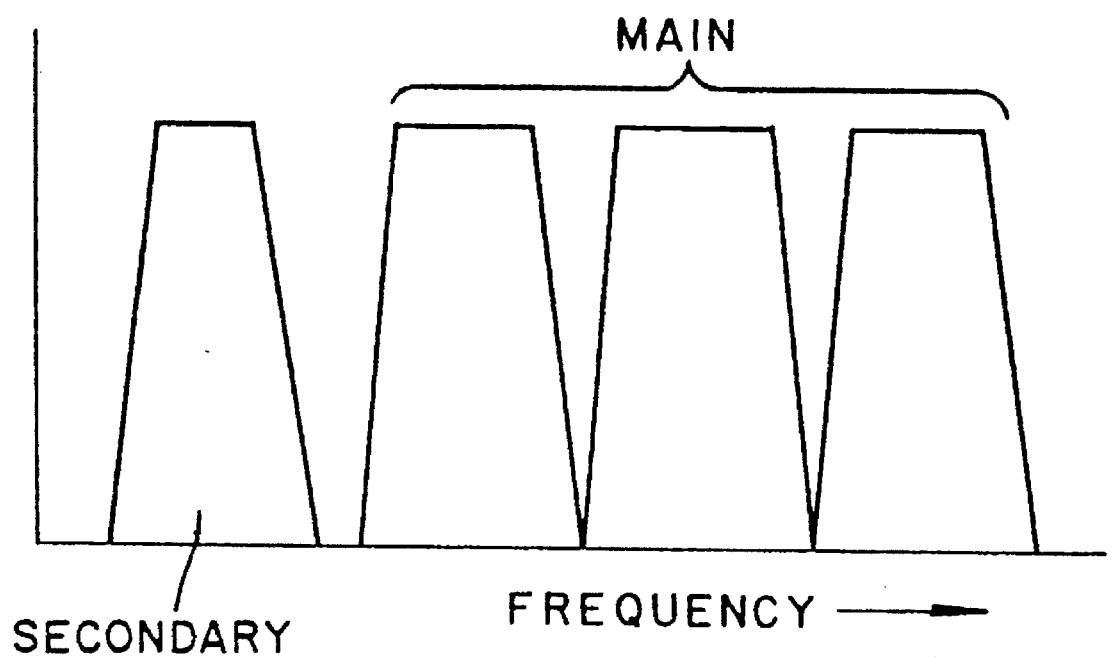
FIG. 6 is a diagram showing frequency bands of a main channel and a secondary channel used in the on-line system of FIG. 3.

Each of the modems 23 and 23' divides a voice band, for example, into three main channels for main data and a secondary channel for secondary data for network supervision, as shown in FIG. 6, by frequency divisional and generates, upon transmission, signal points having a predetermined eye pattern to modulate and transmit data (main data and secondary data). Each of the modems demodulates, upon reception, a receive signal to reproduce data (main data and secondary data). Thus, as shown in FIG. 3, the child station modems 23' can be connected by multi-point connection to the parent station modem 23 by way of the common analog circuit 24.

Figure 4:
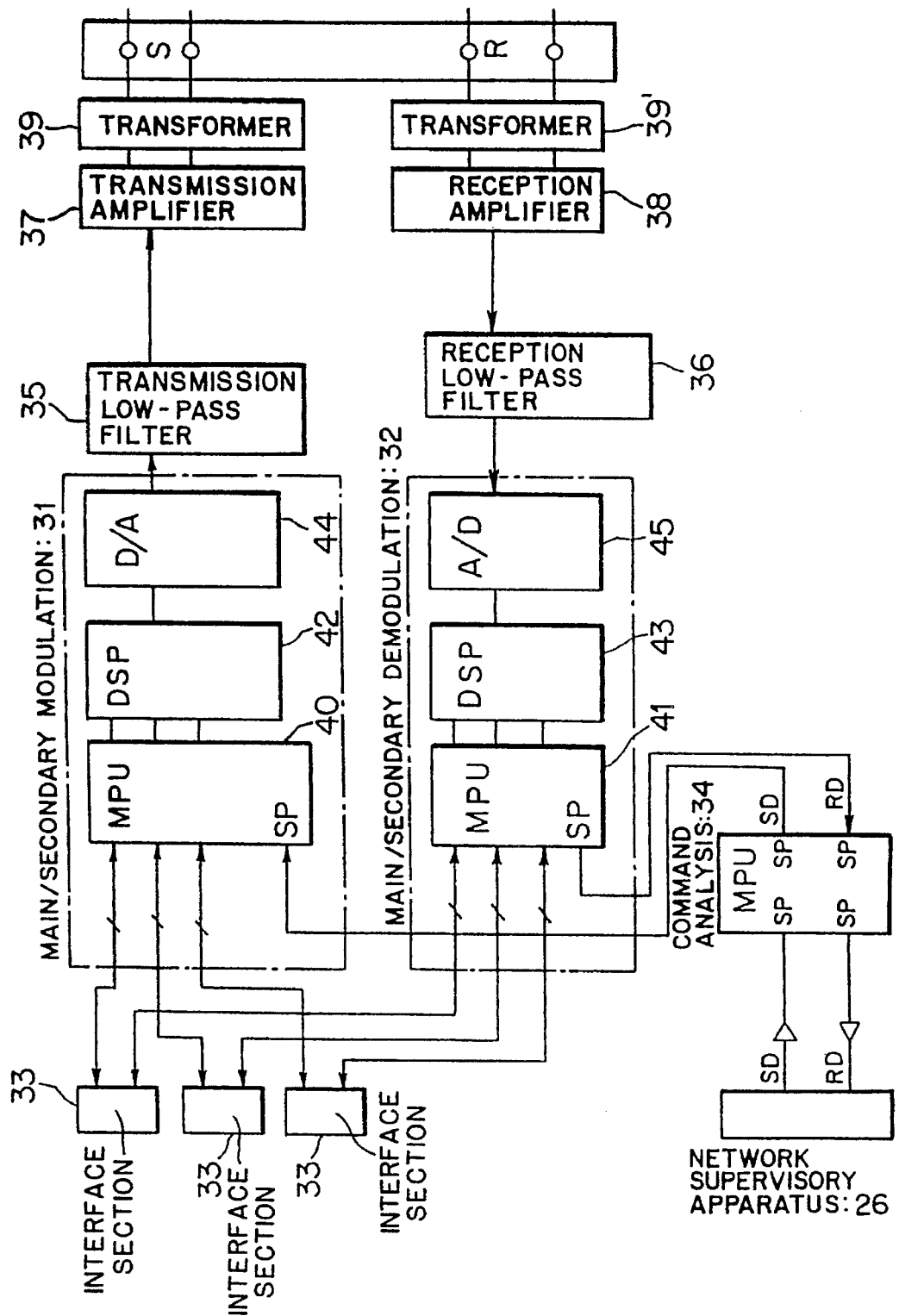
FIG. 4 is a block diagram of an essential part of a modem showing a preferred embodiment of the present invention.

Referring now to FIG. 4, in order for the modem 23 to exhibit such functions as described above, it includes a main/secondary modulation section 31 and a main/secondary demodulation section 32. The modem 23 further includes a plurality of interface sections 33 with the communication control apparatus 22, and a command analysis section 34 interposed between the modem 23 and the network supervisory apparatus 26. The modem 23 further includes a transmission low-pass filter 35, a reception low-pass filter 36, a transmission amplifier 37, a reception amplifier 38 and a pair of transformers 39 and 39'.

Each of the interface sections 33 connects the communication control apparatus 22 and the modem 23 to each other with a synchronous interface (RS232C). The command analysis section 34 performs an analysis of a command from the network supervisory apparatus 26 and production of a response to the network supervisory apparatus 26 and has a function of transferring transmission or reception data SD or RD by way of serial ports SP thereof by high speed serial transfer. Further, the command analysis section 34 connects the network supervisory apparatus 26 and the modem 23 to each other with a start-stop interface (RS485). The main/secondary modulation section 31 includes a microprocessor unit (MPU) 40, a digital signal processor (DSP) 42 and a digital to analog (D/A) converter 44. The main/secondary demodulation section 32 includes an MPU 41, a DSP 43 and an analog to digital (A/D) converter 45. The MPUs and DSPs constituting the main/secondary modulation section 31. The main/secondary demodulation section 32 may individually be provided by suitable plural numbers of MPUs and DSPs depending upon the capacity or processing faculty of the modem 23.

Figure 5:
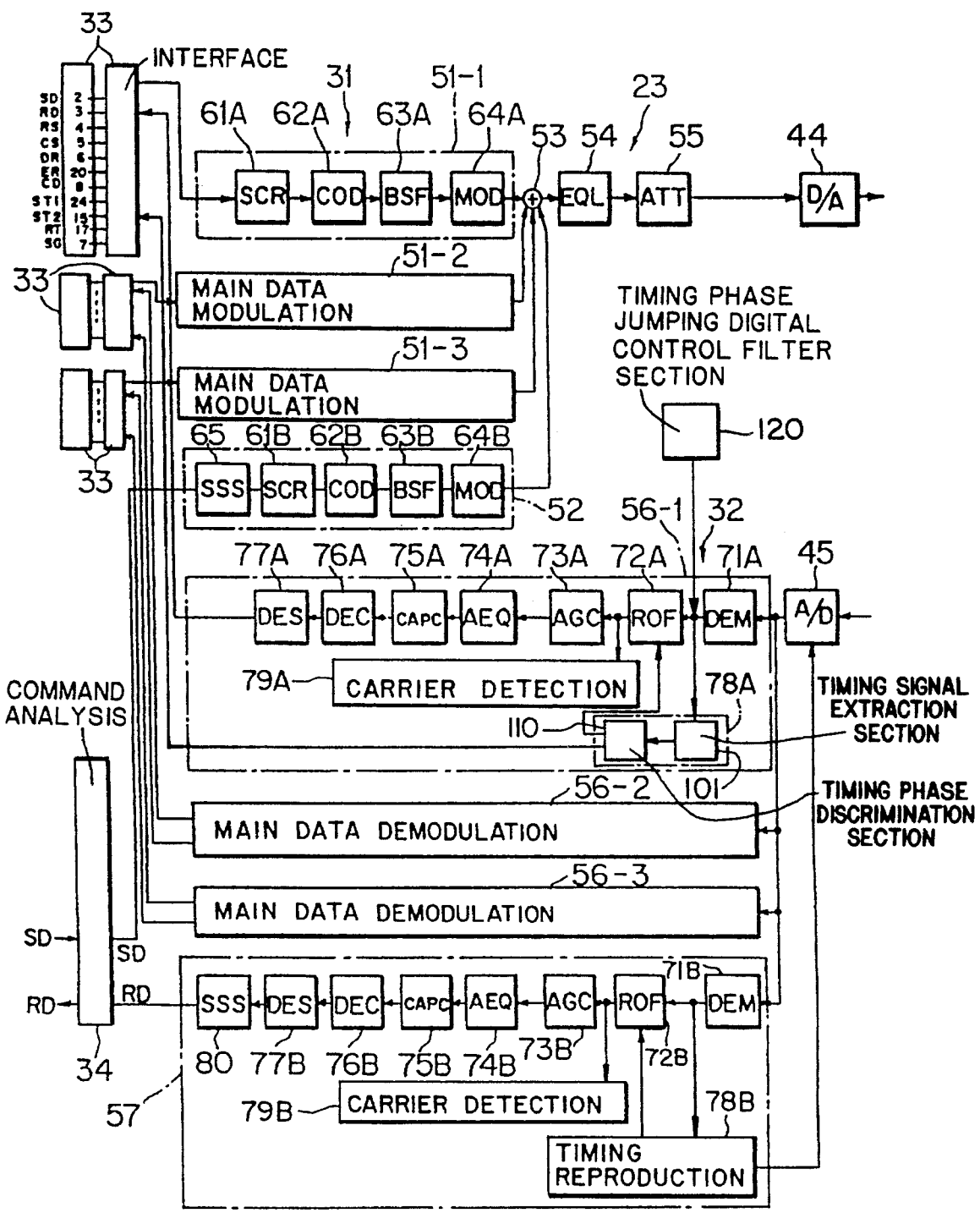
FIG. 5 is a block diagram showing details of the modem shown in FIG. 4.

Now, essential parts of the modem 23 will be described in more detail. Referring now to FIG. 5, the modem 23 includes, in the main/secondary modulation section 31, three main data modulation sections 51-1, 51-2 and 51-3 and a secondary data modulation section 52 as well as an addition section 53, a fixed equalizer 54 and a transmission attenuator 55.

The main data modulation sections 51-1 to 51-3 modulate main data and are equal in number to the number of main channels. In this sample there are 3. Each of the main data modulation sections 51-1 to 51-3 includes a scrambler 61A, a code conversion section 62A, a transmission base band filter 63A and a modulation section 64A. It is to be noted that, while the detailed construction is shown only of the main data modulation section 51-1 in FIG. 5, the other main data modulation sections 51-2 and 51-3 have the same construction as described above.

Here, the scrambler 61A scrambles a signal into a random signal, and the code conversion section 62A performs desired code conversion for the output of the scrambler 61A. Upon such code conversion, the code conversion section 62A generates a signal point having a desired eye pattern (data point plot pattern on a phase plane).

The transmission base band filter 63A passes a base band component of a digital output of the code conversion section 62A, and the modulation section 64A modulates the output of the base band filter 63A with a corresponding main channel frequency.

Meanwhile, the secondary data modulation section 52 modulates secondary data and includes a start-stop synchronization conversion section 65, a scrambler 61B, a code conversion section 62B, a transmission base band filter 63B, and a modulation section 64B.

Here, the start-stop synchronization conversion section 65 performs conversion processing from a start-stop interface to a synchronization interface. The scrambler 61B, the code conversion section 62B, the transmission base band filter 63B and the modulation section 64B have similar functions to those of the scrambler 61A, the code conversion section 62A, the transmission base band filter 63A and the modulation section 64A, respectively. The modulation frequency at the modulation section 64B is the secondary channel frequency.

The transmission MPU 40 shown in FIG. 4 has the functions of the scramblers 61A and the code conversion sections 61A and the code conversion sections 62A of the main data conversion sections 51-1 to 51-3 and the start-stop synchronization conversion section 65, the scrambler 61B and the code conversion section 62B of the secondary data conversion section 52. The transmission DSP 42 shown in FIG. 4 has the functions of the transmission base band filters 63A and the modulation sections 64A of the main data conversion sections 51-1 to 51-3, the transmission base band filter 63B and the modulation section 64B of the secondary data conversion section 52, the addition section 53, the fixed equalizer 54 and the transmission attenuator 55.

Further, the modem 23 includes, in the main/secondary demodulation section 32, three main data demodulation sections 56-1, 56-2 and 56-3 and a secondary data demodulation section 57.

The main data demodulation sections 56-1 to 56-3 demodulate main data and are equal in number to the number of main channels. In this example, there are 3. Each of the main data demodulation sections 56-1 to 56-3 includes a demodulation section 71A, a timing phase jumping digital control filter section 120, a roll-off filter (band separation filter) 72A, an automatic gain control section 73A, an automatic equalization section 74A, a carrier phase correction section 75A, a code conversion section 76A and a descrambler 77A as well as a timing reproduction section 78A and a carrier detection section 79A. While the detailed construction is shown only of the main data demodulation section 56-1 in FIG. 5, the other main data demodulation sections 56-2 and 56-3 have the same construction as described above.

Here, the demodulation section 71A applies demodulation processing to a receive signal after digital conversion by the A/D converter 45.

The timing reproduction section 78A extracts a signal timing from the output of the demodulation section 71A and determines where a signal timing is present. The output of the timing reproduction section 78A is supplied to the roll-off filter 72A and the corresponding interface circuit 33 which will be hereinafter described. The timing reproduction section 78A includes a timing phase extraction section 101 and a timing phase discrimination section 110.

The timing phase extraction section 101 extracts a timing phase from a digital demodulation signal from the demodulation section 71A. The timing phase extraction section 101 is provided, for example, by processing of a DSP (digital signal processor) by software control.

Figure 7:
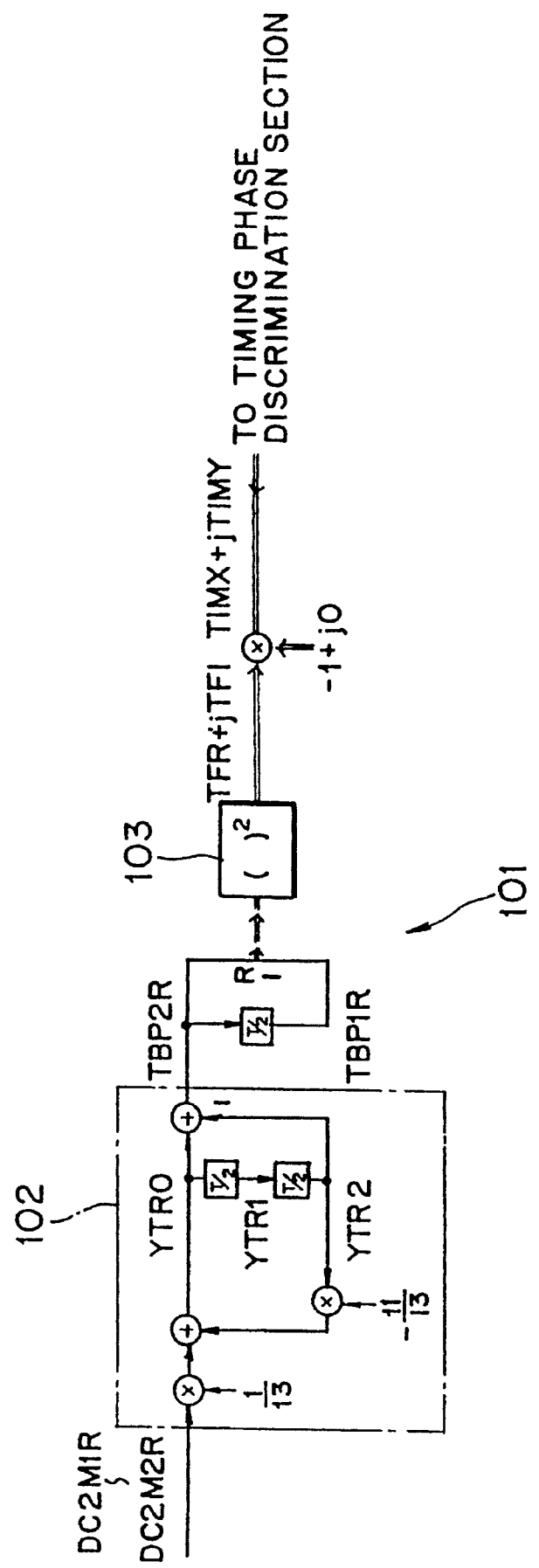
FIG. 7 is a circuit diagram showing an equivalent circuit of a main demodulation side timing phase extraction section of the modem shown in FIG. 5.

The timing phase extraction section 101 may be constructed, for example, in such an equivalent circuit as shown in FIG. 7. Referring now to FIG. 7, the equivalent circuit of the timing phase extraction section 101 shown includes a weight coefficient addition section 102 and a squaring section 103. The output (TIMX+jTIMY) of the equivalent circuit is outputted as extraction information of the timing phase to the timing phase discrimination section 110.

When a demodulation signal (DC2M1R to DC2M2R) is inputted from the demodulation section 71A to the timing phase extraction section 101, such extraction information of the timing phase as shown in FIGS. 8(a) or 8(b) is outputted from the timing signal extraction section 101. FIG. 8(a) illustrates extraction information when the input demodulation signal does not have any lead/lag in phase while FIG. 8(b) illustrates extraction information when the input demodulation signal has a lead of 90° in phase.

Figure 9:
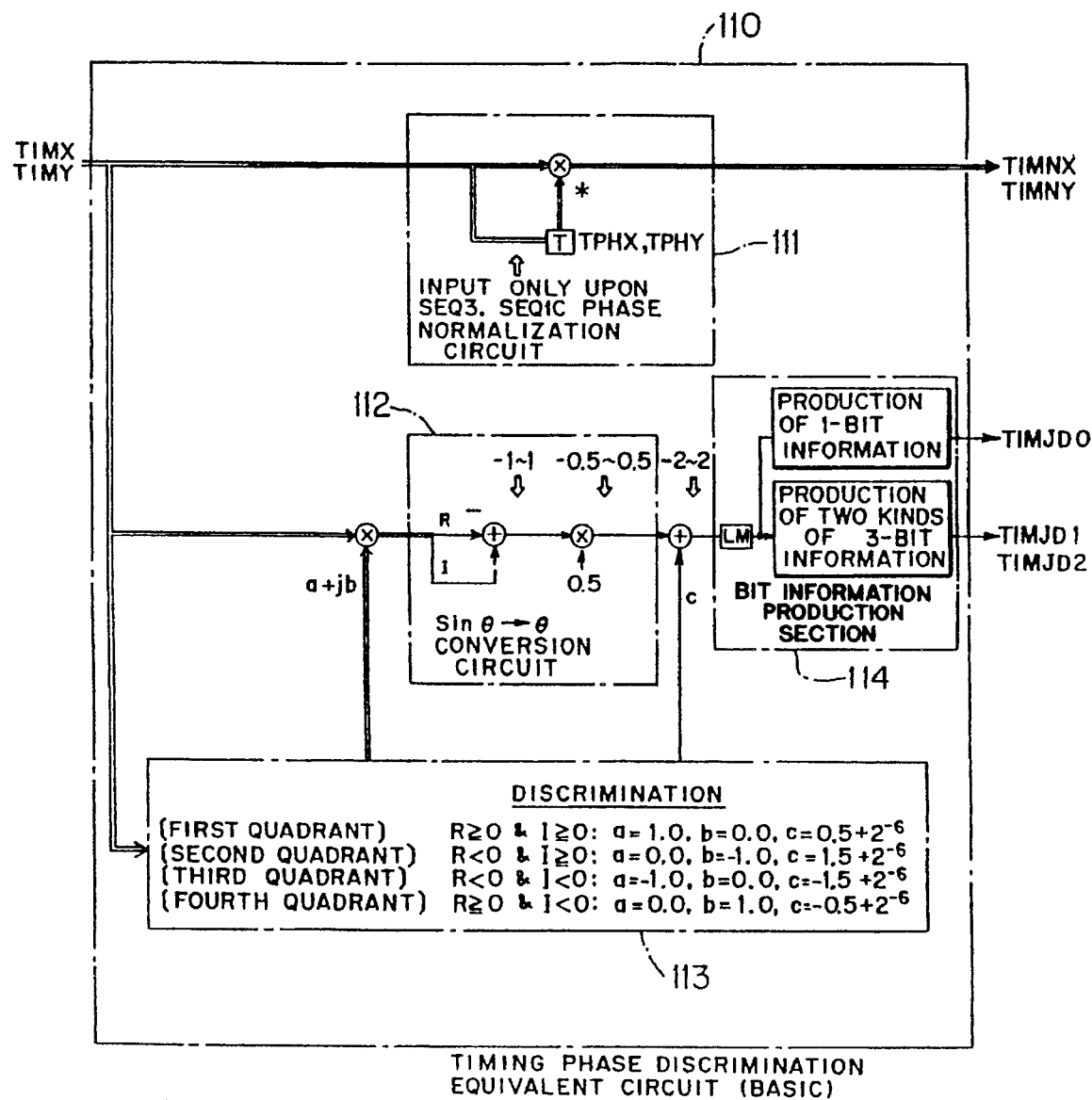
FIG. 9 is a block diagram showing a main side timing phase discrimination section of the modem shown in FIG. 5.

The timing phase discrimination section 110 discriminates a timing phase from a timing phase extracted by the timing phase extraction section 101 and can be represented as an equivalent circuit which has such different functions as shown in FIG. 9. Referring to FIG. 9, the equivalent circuit shown includes a phase normalization circuit 111, an angle conversion circuit 112, a discrimination section 113 and a bit information production section 114.

Figures 10A, 10B, 10C:
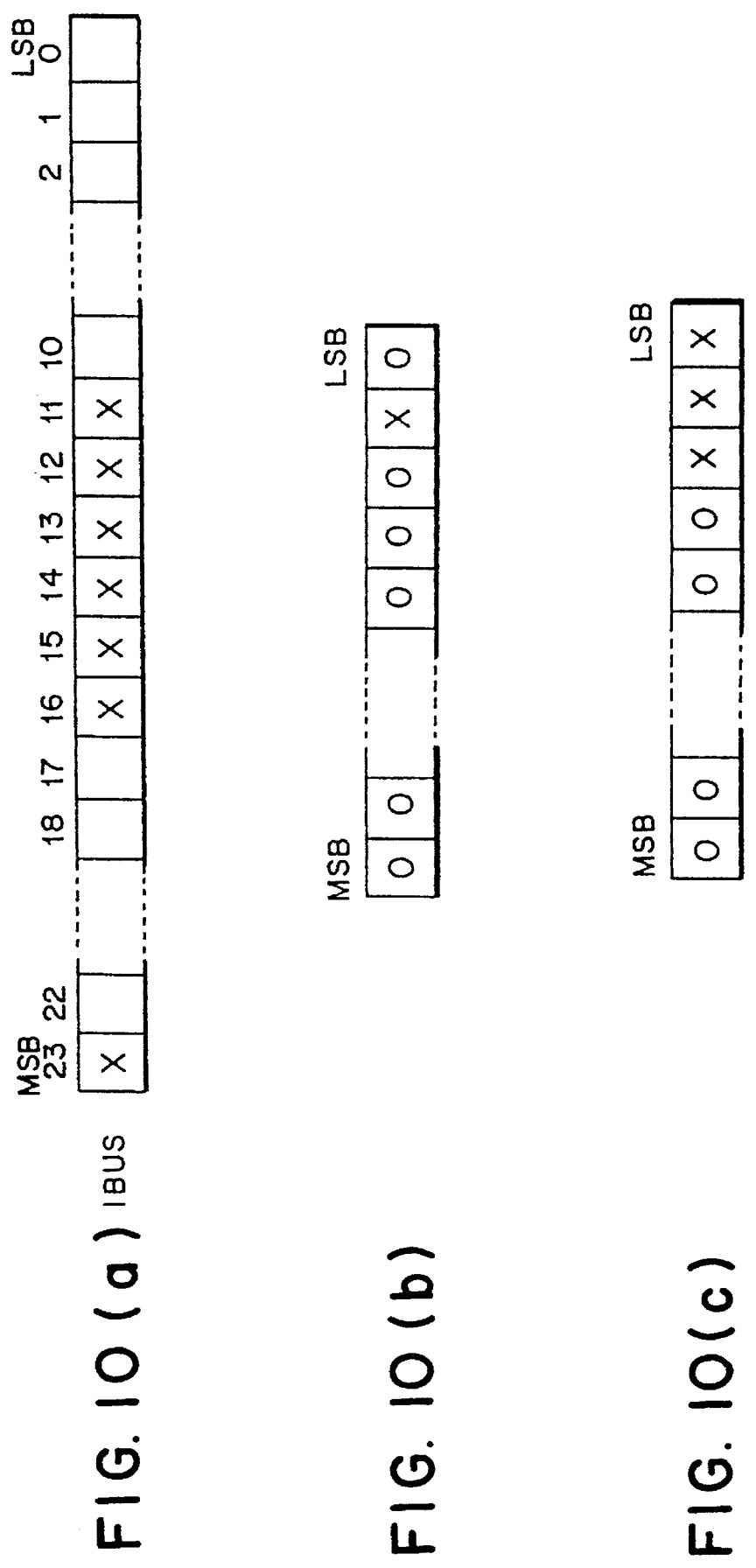

When a signal of, for example, such a data format as shown in FIG. 10(a) is inputted to the bit information production section 114, the bit information production section 114 applies limiter processing, bit information production processing and some other suitable processing to the signal to output, for example, one kind of 1-bit information (TIMJDO) as illustrated in FIG. 10(b) and two kinds of 3-bit information (TIMJD1 and TIMJD2) as illustrated in FIG. 10(c).

The three kinds of bit information are combined suitably to produce timing phase discrimination information, which is outputted to the timing phase jumping digital control filter section 120 described below.

In this instance, phase discrimination occurs at the level of an angle obtained by dividing 360° into 128 fractions using the three kinds of bit information.

Referring back to FIG. 5, the timing phase jumping digital control filter section 120 is formed as a transversal filter which performs filtering by adding filter coefficients and convoluting the sum.

The timing phase jumping digital control filter section 120 is interposed between the demodulation section 71A and the roll-off filter 72A which will be hereinafter described, and steadily jumps the timing phase of a demodulation signal inputted thereto from the demodulation section 71A by a desired amount based on a result of timing phase discrimination from the timing phase discrimination section 110.

Figure 11:
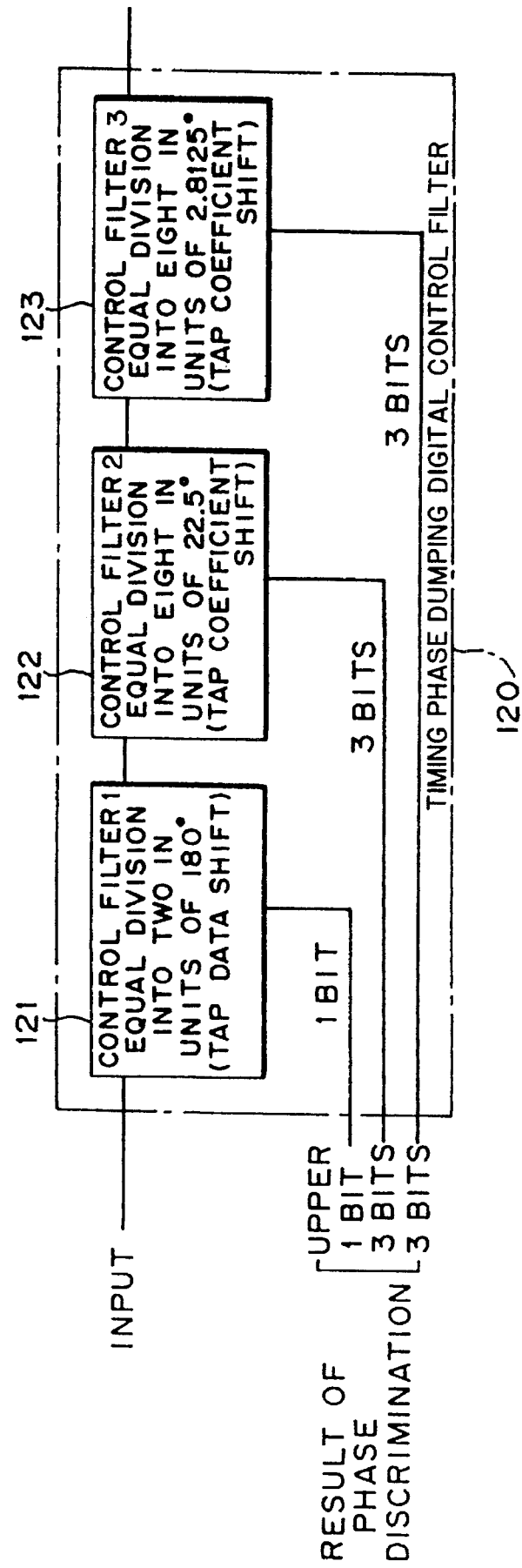
FIG. 11 is a block diagram showing a general construction of an essential part of a timing phase jumping digital control filter section of the modem shown in FIG. 5.

The timing phase jumping digital control filter 120 may include, as shown in FIG. 11, first to third filter sections (timing phase jumping digital control filter sections) 121 to 123 each in the form of a transversal filter.

Here, referring to FIG. 11, the first filter section 121 divides a signal for one period equally into two portions with the phase of 180° by a tap data shifting operation thereof which will be hereinafter described. The second filter section 122 divides a signal from the first filter section 121 equally further into 8 portions by a tap coefficient shifting operation thereof which will be hereinafter described. The third filter section 123 divides a signal from the second filter section 122 equally further into 8 portions by a tap coefficient shifting operation thereof.

In short, the second filter section 122 divides a signal for one period by the phase of 22.5°, and the third filter section 123 divides a signal for one period by a phase of 2.8125°.

The first filter section 121 receives 1-bit information (TIMJDO) as the output of the timing phase discrimination section 110. The second filter section 122 receives 3-bit information (TIMJD1), and the third filter section 123 receives 3-bit information (TIMJD2), to determine the filter coefficients of the first to third filter sections 121 to 123. The first to third filter sections 121 to 123 perform respective filtering operations using the thus determined filter coefficients.

Referring back to FIG. 5, the roll-off filter 72A passes only a signal of a predetermined frequency range of the digital output of the demodulation section 71A. A transversal filter is used for the demodulation section 71A. Further, where the main channel 1 is divided into a plurality of (three) channels as in the present embodiment, the frequency cut-off characteristic of the roll-off filter 72A must necessarily be set steep to narrow the band widths to make a rigid distinction between adjacent frequencies. To this end, the roll-off rate (ROF rate) of the roll-off filter 72A is set low (for example, to 3 to 5% or so).

Figure 13:
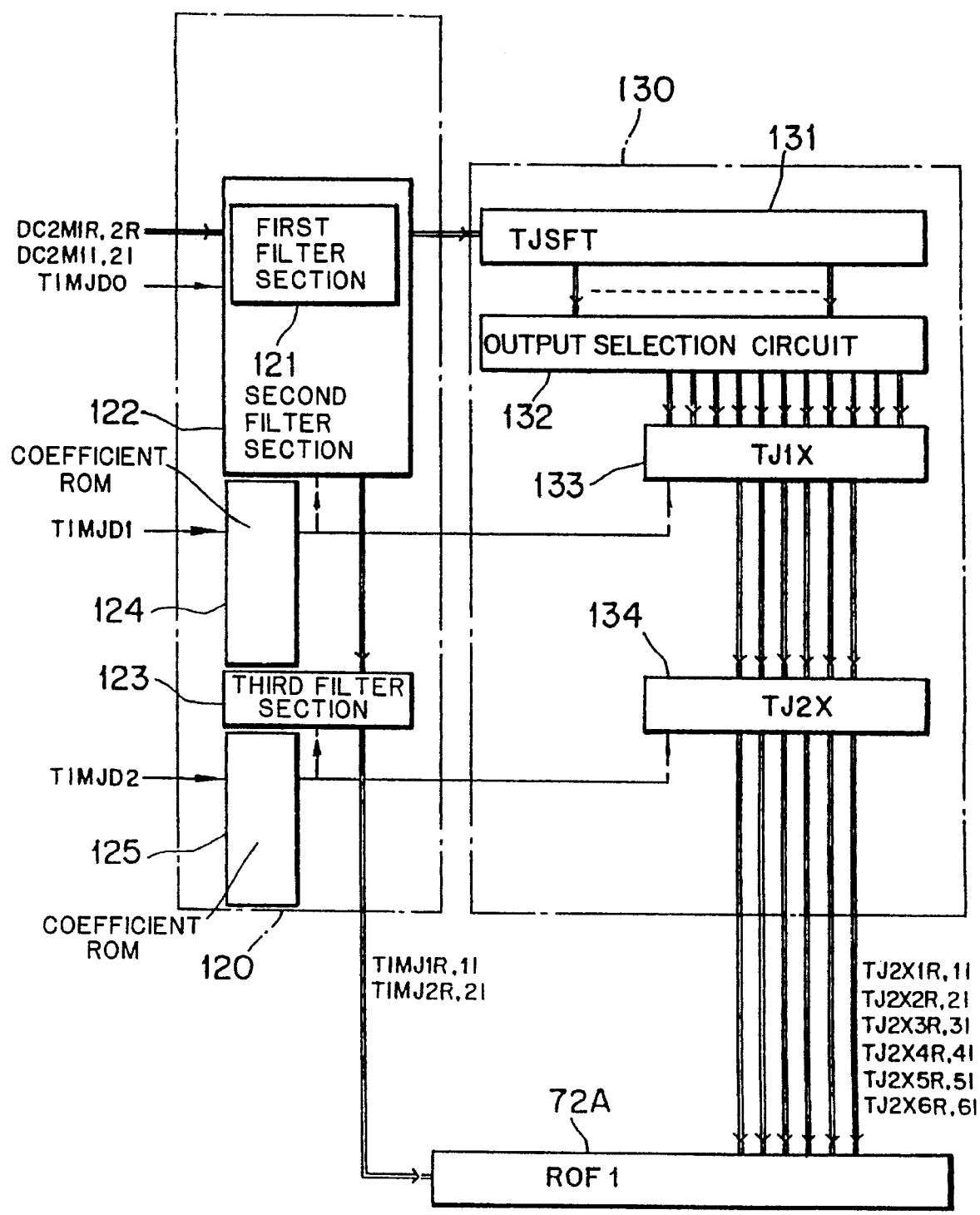
FIG. 13 is a block diagram showing an essential part of an initialization section and the timing phase jumping digital control filter section of the modem shown in FIG. 5.

An initialization section 130 shown in FIG. 13 accumulates a signal from the timing phase jumping digital control filter section 120 as past data and outputs the data together with current data from the timing phase jumping digital control filter section 120 to the roll-off filter 72A to effect initialization processing.

A general construction of the initialization section 130 and the timing phase jumping digital control filter section 120 is shown in FIG. 13. Referring to FIG. 13, the timing phase jumping digital control filter section 120 has such functions as given by the first and second filter sections 121 and 122, the third filter section 123, a second filter section filter coefficient storage section 124, and a third filter section filter coefficient storage section 125.

As described above, the second and third filter sections 122 and 123 are transversal filters which perform filtering by adding filter coefficients, with which timing phase jumping can be performed. Then convolution processing is applied to the sum, and such filter coefficients are stored in the second and third filter section filter coefficient storage sections 124 and 125, respectively.

The second filter section filter coefficient storage section 124 receives 3-bit information (TIMJD1) from the timing phase discrimination section 110 and outputs a filter coefficient in accordance with the three bit information to the second filter section 122 and a delaying digital control filter section 133 which will be hereinafter described.

Similarly, the third filter section filter coefficient storage section 125 outputs a filter coefficient to the third filter section 123 and another delaying digital control filter section 134.

Meanwhile, the initialization section 130 includes delay tap part 131, an output selection circuit 132 and a pair of delaying digital control filter sections (digital control filter sections) 133 and 134.

The delay tap part 131 stores a signal sampled into a digital value for a period of time of a plurality of symbols, i.e., the delay tap part 131 stores past sampling signals equal in number to the number of taps. The delay tap part 131 successively shifts its stored signals while timing phase discrimination is being performed, but stops its shifting operation after completion of the timing phase discrimination.

In other words, while timing phase discrimination is being performed, a new signal is successively stored into the delay tap part 131 while obsolete signal information is abandoned. After completion of the timing phase discrimination, the signal storing operation of the delay tap part 131 is stopped.

The output selection circuit 132 selects data to be filtered from the output of the delay tap part 131 and outputs the selected data to the delaying digital control filter section 133.

The delaying digital control filter section 133 calculates an optimum phase difference of the last sample signal using a value from the delay tap part 131. The delaying digital control filter section 134 calculates an optimum phase difference of the past sample signal using a value from the delaying digital control filter section 133.

The second filter section filter coefficient storage section 124 receives 3-bit information (TIMJD1) from the timing phase discrimination section 110 and outputs a filter coefficient in accordance with the 3-bit information to the second filter section 122 and the delaying digital control filter section 133.

Similarly, the third filter section filter coefficient storage section 125 outputs a filter coefficient to the third filter 123 and the delaying digital control filter section 134.

Consequently, the delaying digital filter section 133 and 134 have similar characteristics to those of the second and third filter sections 122 and 123, respectively.

Figure 14A:
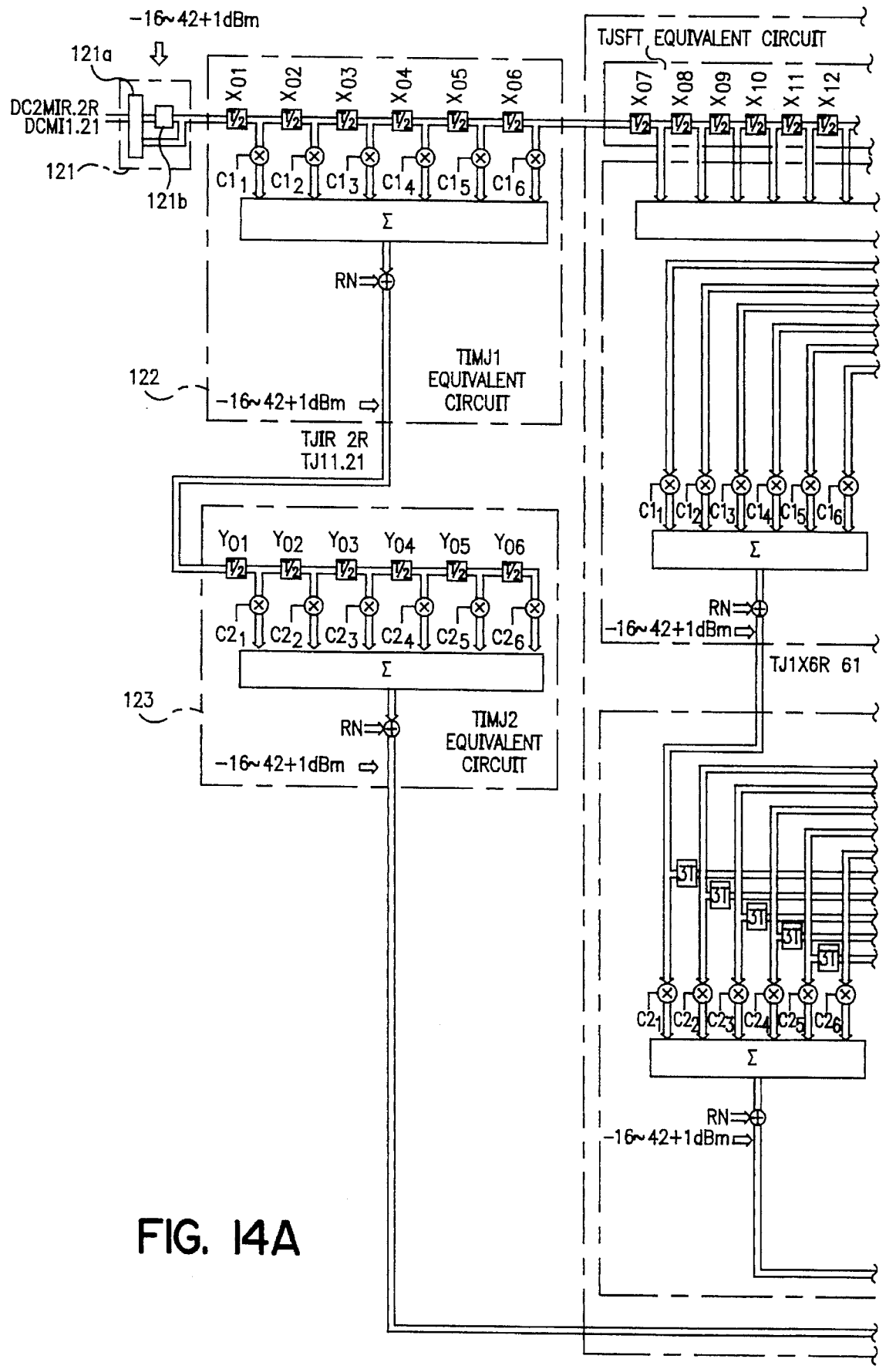
FIG. 14 is a circuit diagram showing details of the initialization section and the timing phase jumping digital control filter section shown in FIG. 13.
Figure 14B:
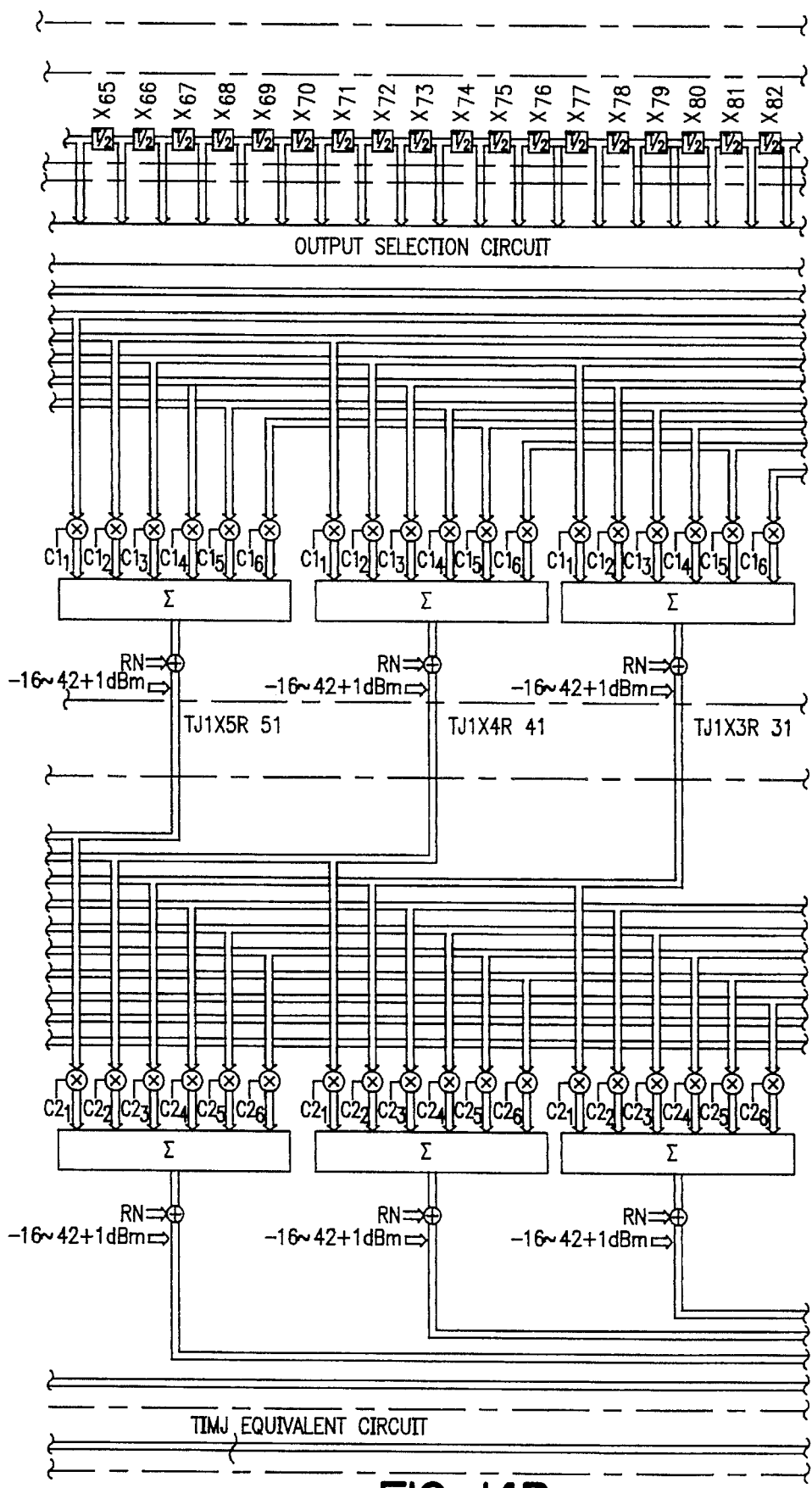
Figure 14C:
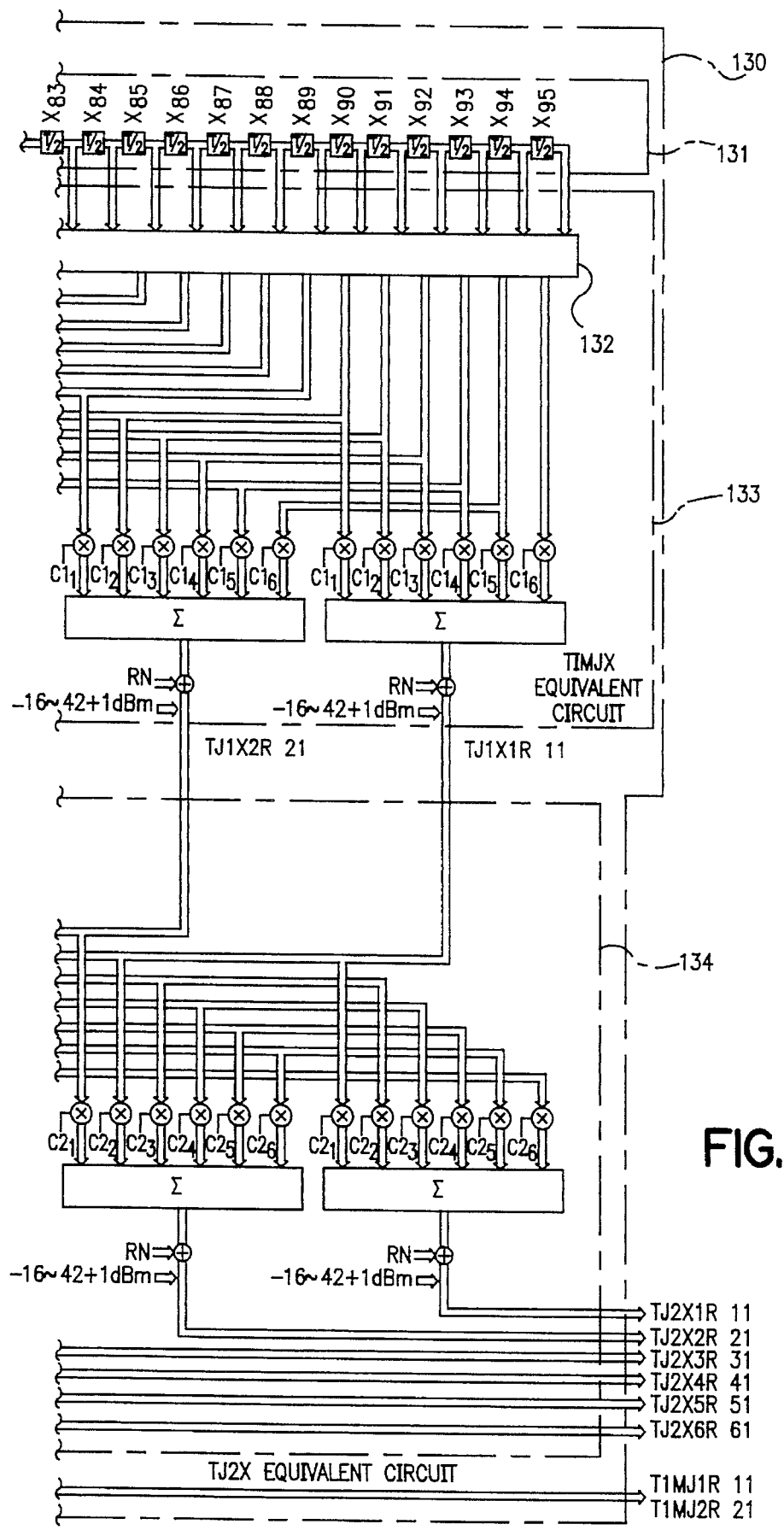

FIG. 14 shows details of the initialization section 130 and the timing phase jumping digital control filter section 120. Referring to FIG. 14, the first filter section 121 of the timing phase jumping digital control filter section 120 has different functions of a selector 121a for selecting a line and phase delaying means 121b for delaying the phase by 180°. When the filter section 121 is formed from a DSP, the functions are provided, for example, by ring buffers.

Meanwhile, each of the second and third filter sections 122 and 123 calculates a convolution twice for one symbol, and each delaying digital filter part 133 and 134 calculates a convolution six times for one symbol. Accordingly, each delaying digital filter part 133 and 134 calculates, for one symbol period, values for three symbols.

Referring back to FIG. 5, the automatic gain control section 73A forms automatic receive level adjustment means for adjusting the loop gain so that the level of the demodulation signal band-limited by the roll-off filter 72A may be equal to a predetermined reference value and inputting the modulation signal to the automatic equalization section 71A at the next stage. The automatic gain control section 73A is required to allow the automatic equalization section 74A at the next stage to operate accurately.

The automatic equalization section 74A performs equalization processing for correcting a transmission distortion and so forth of the circuit. The carrier phase correction section 75A corrects the phase of a carrier from the output of the automatic equalization section 74A.

The code conversion section 76A decodes a coded signal of the output of the carrier phase correction section 75A, and the descrambler 77A descrambles an output of the code conversion section 76A, which is in a scrambled condition as a result of processing at the scrambler 61A in the main/secondary modulation section 31, back into an original signal.

The carrier detection section 79A detects a carrier to detect whether data have been received. The output of the carrier detection section 79A is supplied to a sequencer not shown and thus provides trigger information to the sequencer.

Meanwhile, the secondary data demodulation section 57 demodulates secondary data and includes a demodulation section 71B, a roll-off filter (band separation filter) 72B, an automatic gain control section 73B, an automatic equalization section 74B, a carrier phase correction section 75B, a code conversion section 76B, a descrambler section 77B, and a synchronization to start-stop conversion section 80 as well as a timing reproduction section 78B and a carrier detection section 79B.

Here, the synchronization to start-stop conversion section 80 performs conversion processing from a synchronization interface to a start-stop interface. The demodulation section 71B, the roll-off filter 72B, the automatic gain control section 73B, the automatic equalization section 74B, the carrier phase correction section 75B, the code conversion section 76B, the descrambler section 77B, the timing reproduction section 78B and the carrier detection section 79B have similar functions to those of the demodulation section 71A, the roll-off filter 72A, the automatic gain control section 73A, the automatic equalization section 74A, the carrier phase correction section 75A, the code conversion section 76A, the descrambler section 77A, the timing reproduction section 78A and the carrier detection section 79A, respectively.

However, the roll-off filter 72B of the secondary data demodulation section 57 need not necessarily have a steep frequency cut-off characteristic since the secondary channel is not divided any more, and accordingly, the roll-off rate (ROF rate) of the roll-off filter 72B is set high, for example, 30 to 40%, compared with the roll-off filters 72A for the main channels.

Figure 16:
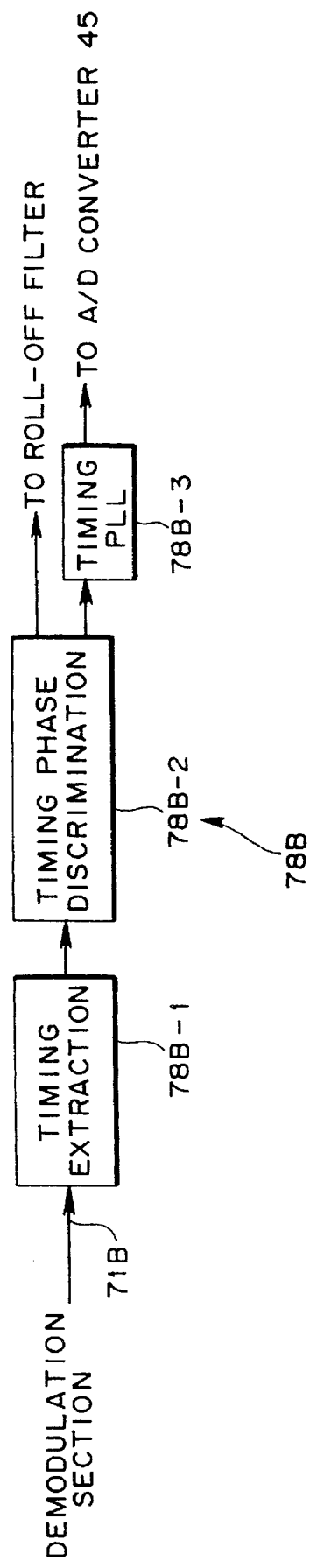
FIG. 16 is a block diagram showing a secondary side timing reproduction section of the modem shown in FIG. 5.

Meanwhile, the timing reproduction section 78B of the secondary data demodulation section 57 extracts a signal timing from the output of the demodulation section 71B and determines where a signal timing is present. Referring now to FIG. 16, the timing reproduction section 78B includes a timing extraction section 78B-1, a timing phase extraction section 78B-2 and a timing PLL section 78B-3.

The timing extraction section 78B-1 extracts a signal timing from the output of the demodulation section 71B, and the timing PLL section 78B-3 has a PLL section and outputs a phase-locked signal.

Meanwhile, the timing phase discrimination section 78B-2 receives as an input signal a demodulation vector signal sampled into a digital value and discriminates at which position of a discrimination plane, which is divided into a plurality of portions, the phase of the input signal is.

Figure 17:
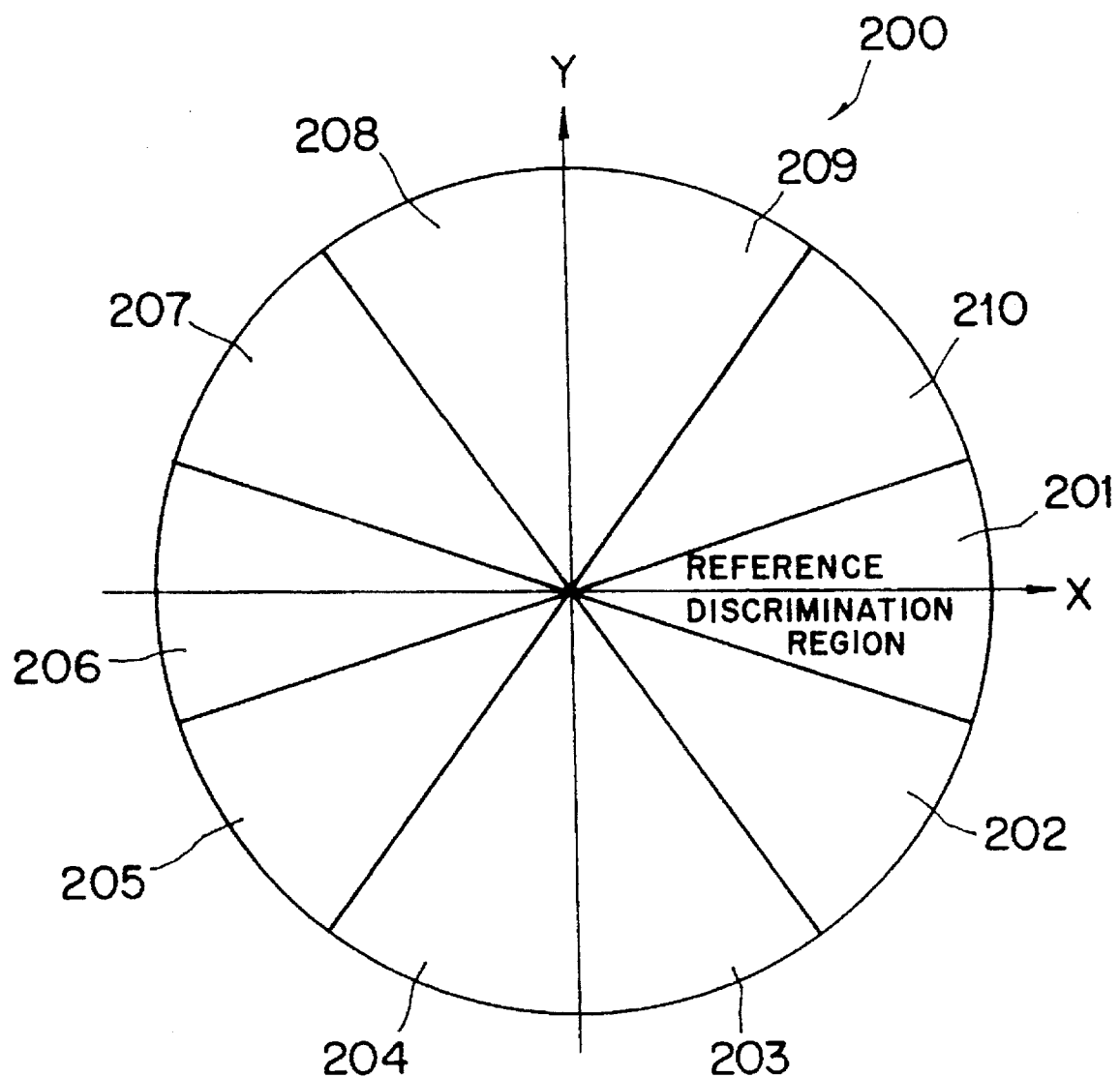
FIG. 17 is a diagrammatic view showing an example of a reference discrimination plane for use with a secondary side timing phase discrimination section of the modem shown in FIG. 5.

For example, the timing phase discrimination section 78B-2 discriminates a timing phase by discriminating to which region of a discrimination plane 200 for all phases, which is divided into 10 regions 201 to 210, as shown in FIG. 17, the demodulation vector signal belongs.

Figure 18:
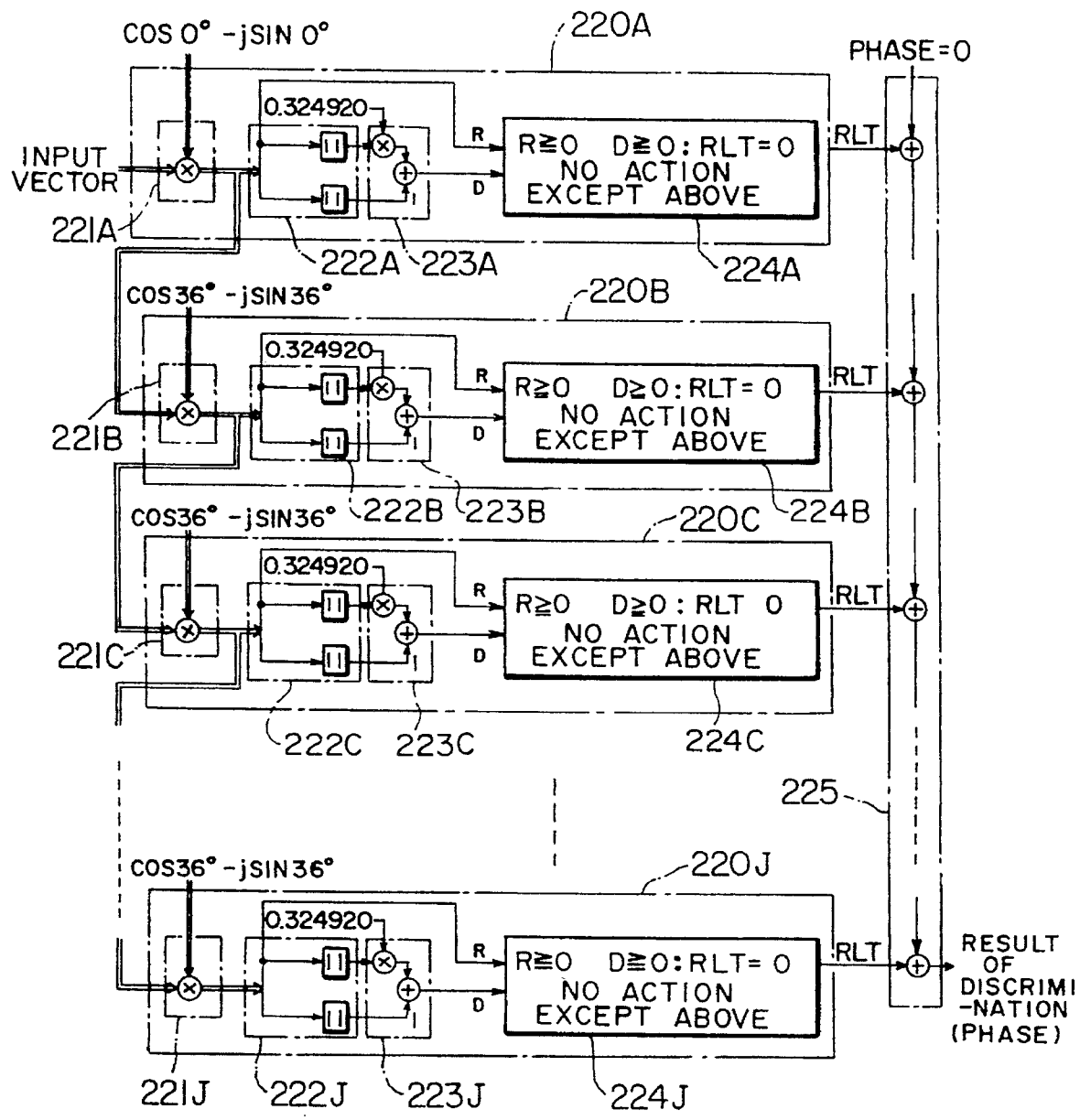
FIG. 18 is a block diagram showing details of the secondary side timing phase discrimination section of the modem shown in FIG. 5.

The timing phase discrimination section 78B-2 which performs phase discrimination based on such discrimination plane 200 as shown in FIG. 17 has such functions as represented by an equivalent circuit diagram in FIG. 18. Referring to FIG. 18, the timing phase discrimination section 78B-2 includes timing phase discrimination units 220A to 220J provided by a number equal to the number (10 in this instance) of the divisional regions of the discrimination plane 200, and a discrimination section 225.

The timing phase discrimination units 220B to 220J include rotation sections (input vector rotation units) 221B to 221J, quadrant movement sections (quadrant movement units) 222B to 222J, angle calculation sections (angle calculation units) 223B to 223J, and timing phase preceding stage processing sections (timing phase preceding step processing units) 224B to 224J, respectively.

Meanwhile, the timing phase discrimination unit 220A includes a quadrant movement section 222A, an angle calculation section 223A, and a timing phase preceding stage processing section 224A.

Here, each of the rotation sections 221B to 221J rotates an input vector thereto by −36°, and the timing phase discrimination unit thereof receives a vector which has been rotated by another timing phase discrimination unit at the preceding stage to it.

Each of the quadrant movement sections 222A to 222J moves a vector into the first quadrant by taking absolute values of a real component and an imaginary component of the vector.

The angle calculation sections 223A to 223J calculate angles of a vector moved into the first quadrant by the quadrant moving sections 222A to 222J. In short, each of the angle calculation sections 223A to 223J conducts a calculation of the equation (2) given below based on absolute values of a real component and an imaginary component of the vector moved by a corresponding one of the quadrant moving sections 222A to 222J:

$$Z = y - 0.324919696 \cdot x \quad (2)$$

Each of the timing phase preceding stage processing sections 224A to 224J outputs a value corresponding to a result Z of a calculation conducted by a corresponding one of the angle sections 223A to 223J. In particular, when the calculation result Z of any of the timing phase preceding stage processing sections 224A to 224J is equal to or smaller than 0, the timing phase preceding stage processing section 224A to 224J discriminates that the vector does not belong to the reference discrimination region 201 of the discrimination plane 200 of FIG. 17, and sets, for example, a variable RLT to "0" and outputs it to the discrimination section 225. When the calculation result Z is greater than "0", the timing phase preceding stage processing section 224A to 224J discriminates that the vector does not belong to the reference discrimination region 201 of the discrimination plane 200 of FIG. 17, and keeps the variable RLT as it is at "1" and outputs it to the discrimination section 225.

The discrimination section 225 adds the variables RLT as the outputs of the timing phase preceding stage processing sections 224A to 224J to an output variable PHASE and conducts phase discrimination of the input vector based on the resultant output variable PHASE.

The variables RLT and the output variable PHASE are individually set to "1" upon initialization.

Referring back to FIG. 5, the output of the timing reproduction section 78B is supplied to the roll-off filter 72B and the A/D converter 45. Accordingly, a frequency timing of secondary data is used as a sample timing of a digital value by the A/D converter 45. The reason why a frequency timing of secondary data is used for sampling of a digital value by the A/D converter 45 is that the ROF ratio in the main channel is so low that it is difficult to extract a timing component from the main channel.

It is to be noted that the reception DSP 43 shown in FIG. 4 has the functions of the demodulation sections 71A, the roll-off filters 72A, the automatic gain control sections 73A, the automatic equalization sections 74A, the carrier phase correction sections 75A, the timing reproduction sections 78A and the carrier detection sections 79A of the main data demodulation sections 56-1 to 56-3 and the demodulation section 71B, the roll-off filter 72B, the automatic gain control section 73B, the automatic equalization section 74B, the carrier phase correction section 75B, the timing reproduction section 78B and the carrier detection section 79B of the secondary data demodulation section 57. The reception MPU 41 shown in FIG. 4 has the functions of the code conversion sections 76A and the descramblers 77A of the main data demodulation sections 56-1 to 56-3 and the code conversion section 76B, the descrambler 77B and the synchronization to start-stop conversion section 80 of the secondary data demodulation section 57.

It is to be also noted that the modems 23' serving as child stations have substantially the same construction as the modem 23 serving as the parent station.

With the construction described above, upon transmission, main data are modulated in the main channels by the main data modulation sections 51-1 to 51-3 while secondary data are modulated in the secondary channel by the secondary data modulation section 52. The outputs of the modulation sections 51-1 to 51-3 and 52 are added by the adder 53 and then processed by suitable processing by the fixed equalizer 54 and the transmission attenuator 55. Then, the output of the transmission attenuator 55 is converted into an analog signal by the D/A converter 44 and then sent into the analog circuit 24.

On the other hand, on the reception side, a receive signal is converted from an analog signal into a digital signal by the analog to digital converter 45, and main data of the receive signal are demodulated and reproduced by the main data demodulation sections 56-1 to 56-3 while secondary data are demodulated and reproduced by the secondary data demodulation section 57.

In this instance, the timing reproduction section 78A in each of the main data demodulation sections 56-1 to 56-3 extracts a signal timing from the output of the demodulation section 71A and discriminates where a signal timing is at the level of an angle obtained by dividing 360° into 128 fractions.

In particular, the timing phase extraction section 101 of the timing reproduction section 78A executes required processing such as addition of a weighting coefficient to a demodulation signal (DC2M1R and DC2M2R) inputted thereto from the demodulation section 71A and squaring calculation as seen from FIGS. 8(a) or 8(b) and outputs timing phase extraction information (TIMX+jTIMY) to the timing phase discrimination section 110.

Then, in the timing phase discrimination section 110, a timing phase is discriminated based on a timing phase extracted by the timing phase extraction section 101 and is outputted as one type of 1-bit information (TIMJD0) as seen in FIG. 10(b) and two types of 3-bit information (TIMJD1 and TIMJD2) as seen in FIG. 10(c) to the timing phase jumping digital control filter part 120. Here, TIMJD0 is a signal which indicates to which one of two angle ranges of 180° obtained by dividing 360° equally into two the angle of the output signal belongs and angle ranges of 22.5° obtained by dividing each angle range of 180° equally into eight the angle of the output signal belongs. TIMJD2 is a signal which indicates to which one of eight angle ranges of 2.8125° obtained by dividing each angle range of 22.5° equally into eight the angle of the output signal belongs.

The timing phase jumping digital control filter 120 performs filtering by adding a filter coefficient based on the result of discrimination of a timing phase from the timing phase discrimination section 110 and performing convolution processing of the sum to steadily jump the timing phase of the demodulation signal by a desired amount inputted thereto from the demodulation section 71A.

The 1-bit information (TIMJD0) and the 3-bit information (TIMJD1 and TIMJD2) as a result of discrimination of a timing phase are inputted, in the timing phase jumping digital control filter section 120, to the first to third filter sections 121 to 123 respectively.

Here, in the first filter section 121, in an impulse response shown, for example, in FIG. 12(a), a signal for one period is equally divided into two portions by the phase of 180° as indicated by points a and e and so forth. Also in the second filter section 122, the distance between each adjacent ones of the points a and e divided by the first filter section 121 is divided equally into 8 portions as seen in FIG. 12(a). The third filter section 123 divides each of the portions of the signal divided by the second filter section 122 equally into 8 portions as seen in FIG. 12(b).

In short, the second filter section 122 divides a signal for one period by the phase of 22.5°, and the third filter section 123 divides the signal for one period by the phase of 2.8125°, thereby to effect filtering.

By the way, the initialization section 130 stores a signal from the timing phase jumping digital control filter section 120 as past data and outputs the data together with current data from the timing phase jumping digital control filter section 120 to the roll-off filter 72A. Consequently, the initialization section 130 can continuously output the signal beginning with the top or a portion preceding to the top of it to the roll-off filter 72A.

For example, upon reception of data of the form wherein a training signal is added prior to data information as seen in FIG. 15(a), if timing phase discrimination is performed, for the example, at a point P1, then the initialization section 130 successively outputs the data beginning with a portion prior to the top of the transmission signal (that is, beginning with a point P2 in FIG. 15(a)) to the roll-off filter 72A.

In this instance, when timing phase discrimination of a signal sampled into a digital value continues to be performed for a plurality of symbols, the delay tap part 131 always shifts and stores the signal. After completion of the timing phase discrimination, the delay tap part 131 stops its shifting operation.

The output selection circuit.132 selects data to be filtered from the output of the delay tap part 131 and outputs the selected data to the delaying digital control filter section 133.

The delaying digital control filter section 133 calculates an optimum phase difference of the past sample signal using the value from the delay tap part 131. The delaying digital control filter section 134 calculates an optimum phase difference of the past sample signal using the value from the delaying digital control filter section 133.

The second filter section filter coefficient storage section 124 receives the 3-bit information (TIMJD1) from the timing phase discrimination section 110 and outputs a particular filter coefficient to the second filter section 122 and the delaying digital control filter section 133.

Similarly, the third filter section filter coefficient storage section 125 outputs a filter coefficient to the third filter section 123 and the delaying digital control filter section 134.

Further, while each of the second and third filter sections 122 and 123 calculates twice for a period of one symbol, each of the delaying digital filter parts 133 and 134 calculates six times for a period of one symbol. Accordingly, each of the delaying digital filter parts 133 and 134 can calculate, for a period of one symbol, values for a period of three symbols in the past.

In this manner, in the present embodiment, upon demodulation and reproduction of main data, the number of filter coefficients to be stored can be reduced significantly even for timing phase jumping, for example, at the level of an angle obtained by dividing 360° into 128 fractions by filtering using a multi-stage filter provided by the timing phase jumping digital control filter section 120. Consequently, reduction of the storage capacity can be realized.

Further, also after timing phase discrimination is performed for such a signal during training as indicated, for example, by the point P1 in FIG. 15(a) an optimum sampling timing phase value can be calculated from a transient portion of the training signal prior to the top (point P2) of it. Consequently, by providing a delay circuit and a sum circuit to the output of the roll-off filter 72A, a signal shown in FIG. 15(a) can be delayed (refer to FIG. 15(b)), and the delay signal and the signal shown in FIG. 15(a) are added to make such a signal as seen in FIG. 15(c) to reproduce such a single sampling impulse as seen in FIG. 15(d).

Meanwhile, during a demodulation and reproduction operation for secondary data, operation of the timing phase discrimination section 78B-1 of the timing reproduction circuit 78B is as follows. Here, each of the rotation sections 221B to 221J rotates an input vector by −36°, and the timing phase discrimination unit thereof receives a vector which has been rotated by another timing phase discrimination unit at the preceding stage to it.

Consequently, from the timing phase discrimination units 221A to 221J, signals obtained by rotating the demodulation vector signal by 0°, −36°, −72°, ..., and −324° are inputted to the quadrant movement sections 222A to 222J at the next stage, respectively.

While each of the quadrant movement sections 222A to 222J moves a vector to the first quadrant, such movement depends upon absolute values of a real component and an imaginary component of the vector.

Then, each of the angle calculation sections 223A to 223J calculates an angle of the vector moved to the first quadrant by a corresponding one of the quadrant movement sections 222A to 222J. In particular, calculation given by the following equation (2) is performed based on absolute values of a real component and an imaginary component of the vector calculated by a corresponding one of the quadrant movement sections 222A to 222J.

$$Z = y - 0.324919696 \cdot x \qquad (2)$$

Any of the timing phase preceding stage processing sections 224A to 224J discriminates, when a result Z of calculations performed by a corresponding one of the angle calculation sections 223A to 223J is equal to or smaller than "0", that the vector belongs to the reference discrimination region 201 of the discrimination plane 200 of FIG. 17, and then sets, for example, the variable RLT to "0" and outputs it to the discrimination section 225. But when the result Z of the calculation is greater than "0", then the timing phase preceding stage processing section 224A to 224J determines that the vector does not belong to the reference discrimination region 201 of the discrimination plane 200 of FIG. 17, and then keeps the variable RLT as it is at "1" and outputs it to the discrimination section 225.

The discrimination section 225 adds variables RLT as the outputs of the timing phase preceding stage processing sections 224A to 224J to the output variable PHASE and executes phase discrimination of the input vector based on the thus resulted output variable PHASE.

The variable RLT and the output variable PHASE are initially set to "1" and "0", respectively.

Accordingly, upon demodulation and reproduction for secondary data, information regarding rotation angles possessed by the rotation sections 221A to 221J in the timing phase discrimination section 78B-2 is only that of −36°, and therefore, information regarding this can be stored commonly. Consequently, reduction of the storage capacity can be realized.

While, in the present embodiment, the filters of the timing phase jumping digital control filter section 120 are constructed in three stages to divide the phase of 360° into 128 portions, the timing phase jumping digital control filter section 120 can be constructed from filters of a greater number of stages so as to divide the phase of the 360° into a number of portions greater than 128 to perform filtering.

Further, while timing phase discrimination for secondary data is performed by dividing the phase of 360° into 10 portions, advantageously the phase of 360° can be divided into a greater number of portions to effect phase discrimination without increasing the storage capacity for rotation angles.

Furthermore, while the embodiment described above is applied to a modem which employs a multi-point connection technique wherein a frequency band for a main channel is divided into a plurality of bands to transmit a plurality of data by way of a same circuit, the subject matter of the present invention can be applied similarly to modems of any other type.

While the embodiment described above is applied to a modulator and demodulator apparatus and a modulation and demodulation method which employ a multiple point connection technique wherein a plurality of data are transmitted by way of a same circuit, the spirit of the present invention can be applied similarly to modems of different types such as, for example, a modem wherein a frequency band used is not divided into a main channel and a secondary channel.

The present invention is not limited to the specifically described embodiment, and variations and modifications may be made without departing from the scope of the present invention.

What is claimed is:

1. A modulator and demodulator apparatus in which a signal is communicated in a main channel for main data and a secondary channel for secondary data obtained by frequency division, said modulator and demodulator apparatus comprising:

modulation means for modulating and transmitting main data and secondary data; and demodulation means for receiving and demodulating a receive signal to reproduce main data and secondary data, said demodulation means comprising timing phase discrimination means for receiving, as an input signal thereto, a demodulation vector signal sampled into a digital value and discriminating to which one of a plurality of regions of a discrimination plane the phase of the input signal belongs;

said timing phase discrimination means for inputting, as an input to a next processing stage, a rotated demodulation vector signal obtained by rotating the demodulation vector signal, for moving the rotated demodulation vector signal to a first quadrant which includes a reference discrimination region of the discrimination plane, for performing a predetermined calculation outputting one of two binary values when the rotated demodulation vector signal is not in the reference discrimination region of the discrimination plane, for performing another calculation outputting the other one of the two binary values when the rotated demodulation vector signal is within the reference discrimination region of the discrimination plane, and for discriminating a timing phase of the rotated demodulation vector signal from the result of one of the predetermined calculation and the another calculation.

2. A modulator and demodulator apparatus as claimed in claim 1, wherein said timing phase discrimination means comprises:

timing phase discrimination units equal in number to the plurality of regions of the discrimination plane; and discrimination means for applying the predetermined calculation to outputs of said timing phase discrimination units and discriminating a timing phase of the rotated demodulation vector signal from a result of the predetermined calculation, each of said timing phase discrimination units comprising:

input vector rotation means for rotating the demodulation vector signal;

quadrant movement means for moving the rotated demodulation vector signal to the first quadrant;

angle calculation means for calculating angles of the rotated demodulation vector signal moved to the first quadrant by said quadrant movement means; and timing phase discrimination preceding stage processing means for outputting a first value when the rotated demodulation vector signal moved by a corresponding one of said quadrant movement means is not in the reference discrimination region of the discrimination plane and outputting a second value when the rotated demodulation vector signal is in the reference discrimination region of the discrimination plane, and an output of said input vector rotation means of each of said timing phase discrimination units is used as an input to an adjacent one of said timing phase discrimination units at a preceding processing stage.

3. A modulator and demodulator apparatus as claimed in claim 2, wherein each of said timing phase discrimination preceding stage processing means outputs one of two binary values when an angle of the rotated demodulation vector signal moved by a corresponding one of said quadrant movement means is not in the reference discrimination region of the discrimination plane, and outputs the other one of the two binary values when the rotated demodulation vector signal is within the reference discrimination region of the discrimination plane, and said discrimination means adds outputs of the timing phase discrimination preceding stage processing means of said timing phase discrimination units and discriminates a timing phase of the rotated demodulated vector signal from a result thereof.

4. A modulator and demodulator apparatus as claimed in claim 1, wherein said demodulation means comprises:

main data demodulation means for digitally demodulating the receive signal to reproduce main data of the main channel; and secondary data demodulation means for digitally demodulating the receive signal to reproduce secondary data of the secondary channel, and said timing phase discrimination means of said secondary data demodulation means inputs, as an input to the next processing stage, a rotated vector obtained by rotating the demodulation vector signal, moves the rotated demodulation vector signal to a first quadrant which includes a reference discrimination region of the discrimination plane, performs the predetermined calculation when the rotated demodulation vector signal after movement is not in the reference discrimination region of the discrimination plane, performs the another calculation when the rotated demodulation vector signal after movement is within the reference discrimination region of the discrimination plane, and discriminates a timing phase of the demodulation vector signal from the one of the result of the predetermined calculation and the another calculation.

5. A modulator and demodulator apparatus in which a signal is communicated in a main channel for main data and a secondary channel for secondary data obtained by frequency division, comprising:

modulation means for modulating and transmitting main data and secondary data; and demodulation means for receiving and demodulating a receive signal to reproduce main data and secondary data, said demodulation means including:

demodulation processing means for digitally demodulating the receive signal and for producing a digital demodulation signal;

digital roll-off filter means for applying band separation processing to the digital demodulation signal from said demodulation processing means;

timing phase extraction means for extracting a timing phase from the digital demodulation signal from said demodulation processing means;

timing phase discrimination means for discriminating a timing phase signal from the timing phase extracted by said timing phase extraction means; and timing phase jumping digital control filter means provided at a preceding stage to said digital roll-off filter means for offsetting the timing phase by an amount in accordance with a result of timing phase discrimination from said timing phase discrimination means.

6. A modulator and demodulator apparatus as claimed in claim 5, wherein said demodulation means further includes:

main data demodulation means for digitally demodulating the receive signal to reproduce main data of the main channel; and secondary data demodulation means for digitally demodulating the receive signal to reproduce secondary data of the secondary channel, each of said main data demodulation means and said secondary data demodulation means including said demodulation processing means, said digital roll-off filter means, said timing phase extraction means and said timing phase discrimination means, said timing phase jumping digital control filter means being provided only at a preceding stage to said roll-off filter means of said main data demodulation means.

7. A modulator and demodulator apparatus as claimed in claim 6, wherein each of said roll-off filter means and said timing phase jumping digital control filter means is a filter having an output conforming to a cosine square function.

8. A modulator and demodulator apparatus as claimed in claim 5, wherein each of said roll-off filter means and said timing phase jumping digital control filter means is a filter having an output conforming to a cosine square function.

9. A modulator and demodulator apparatus as claimed in claim 5, wherein said demodulation means further comprises initialization means for initializing said roll-off filter means using past data before a training signal added to a top of the receive signal is received by said demodulation means.

10. A modulator and demodulator apparatus as claimed in claim 9, wherein said initialization means comprises:

delay tap means for storing a signal sampled into digital values equal in number to a number of taps; and digital control filter means for calculating an optimum phase difference of the past sample signal using an output of said delay tap means.

11. A modulator and demodulator apparatus as claimed in claim 10, wherein said initialization means further comprises selection means interposed between said delay tap means and said digital control filter means for selecting part of a plurality of outputs of said delay tap means and inputting the selected output of said delay tap means to said digital control filter means.

12. A modulator and demodulator apparatus as claimed in claim 11, wherein each of said roll-off filter means and said timing phase jumping digital control filter means is a filter having an output conforming to a cosine square function.

13. A modulator and demodulator apparatus as claimed in claim 10, wherein said digital control filter means includes a plurality of digital control filter sections having different offset amounts.

14. A modulator and demodulator apparatus as claimed in claim 13, wherein each of said plurality of digital control filter sections includes a plurality of digital control filter elements disposed in parallel to each other.

15. A modulator and demodulator apparatus as claimed in claim 13, wherein filter coefficient information used by each of said digital control filter sections of said initialization means and filter coefficient information used by each of said digital control filter sections of said timing phase jumping digital control filter means are the same.

16. A modulator and demodulator apparatus as claimed in claim 10, wherein each of said roll-off filter means and said timing phase jumping digital control filter means is a filter having an output conforming to a cosine square function.

17. A modulator and demodulator apparatus as claimed in claim 9, wherein each of said roll-off filter means and said timing phase jumping digital control filter means is a filter having an output conforming to a cosine square function.

18. A modulator and demodulator apparatus in which a signal is communicated in a plurality of main channels for a plurality of main data and a secondary channel for secondary data obtained by frequency division, comprising:

modulation means for modulating and transmitting main data and secondary data; and demodulation means for receiving and demodulating a receive signal to reproduce a plurality of main data and secondary data, said demodulation means comprising:

a plurality of main data demodulation means equal in number to a number of the plurality of main channels for digitally demodulating the receive signal to reproduce main data of the main channels;

secondary data demodulation means for digitally demodulating the receive signal to reproduce secondary data of the secondary channel;

each of said main data demodulation means and said secondary data demodulation means comprising:

demodulation processing means for digitally demodulating the receive signal and for producing a digital demodulation signal;

digital roll-off filter means for applying band separation processing to the digital demodulation signal from said demodulation processing means;

timing phase extraction means for extracting a timing phase from the digital demodulation signal from said demodulation processing means;

timing phase discrimination means for discriminating a timing phase from the timing phase extracted by said timing phase extraction means; and timing phase jumping digital control filter means provided at a preceding stage to said roll-off filter means of each of said main data demodulation means for offsetting the timing phase by an amount in accordance with a result of timing phase discrimination from said timing phase discrimination means of said main data demodulation means.

19. A modulator and demodulator apparatus as claimed in claim 18, wherein each of said timing phase jumping digital control filter means comprises a plurality of timing phase jumping digital control filter sections having different timing phase offset amounts.

20. A modulator and demodulator apparatus as claimed in claim 19, wherein a sampling frequency of said timing phase jumping digital control filter means is set to twice a rate of said modulator and demodulator apparatus.

21. A modulator and demodulator apparatus as claimed in claim 19, wherein a timing phase offset amount of one of said digital control filter sections which has a timing phase offset amount greater than a timing phase offset amount of other of said digital control filter sections is set to 180°.

22. A modulator and demodulator apparatus as claimed in claim 19, wherein a timing phase offset amount of one of said digital control filter sections which has an ith greatest timing phase offset amount is set to $180°/2^N$, i being a natural number, N being $(i-1) \times n$, and n being a natural number.

23. A modulator and demodulator apparatus as claimed in claim 18, wherein a sampling frequency of said timing phase jumping digital control filter means is set to twice a rate of said modulator and demodulator apparatus.

24. A modulator and demodulator apparatus as claimed in claim 18, wherein each of said roll-off filter means and said timing phase jumping digital control filter means is a filter having an output conforming to a cosine square function.

25. A modulator and demodulator apparatus as claimed in claim 18, wherein said demodulation means further comprises initialization means for initializing said roll-off filter means using past data before a training signal added to a top of the receive signal is received by said demodulation means.

26. A modulator and demodulator apparatus as claimed in claim 25, wherein said initialization means comprises:
    delay tap means for storing a signal sampled into digital values equal in number to a number of taps, and producing a past sample signal; and
    digital control filter means for calculating an optimum phase difference of the past sample signal using an output of said delay tap means.

27. A modulator and demodulator apparatus as claimed in claim 26, wherein said initialization means further comprises selection means interposed between said delay tap means and said digital control filter means for selecting part of a plurality of outputs of said delay tap means and inputting the selected output of said delay tap means to said digital control filter means.

28. A modulator and demodulator apparatus as claimed in claim 27, wherein each of said roll-off filter means and said timing phase jumping digital control filter means is a filter having an output conforming to a cosine square function.

29. A modulator and demodulator apparatus as claimed in claim 26, wherein said digital control filter means includes a plurality of digital control filter sections having different offset amounts.

30. A modulator and demodulator apparatus as claimed in claim 29, wherein each of said plurality of digital control filter sections includes a plurality of digital control filter elements disposed in parallel to each other.

31. A modulator and demodulator apparatus as claimed in claim 29, wherein filter coefficient information used by each of said digital control filter sections of said initialization means and filter coefficient information used by each of said digital control filter sections of said timing phase jumping digital control filter means are equivalent to the same.

32. A modulator and demodulator apparatus as claimed in claim 26, wherein each of said roll-off filter means and said timing phase jumping digital control filter means is a filter having an output conforming to a cosine square function.

33. A modulator and demodulator apparatus as claimed in claim 25, wherein each of said roll-off filter means and said timing phase jumping digital control filter means is a filter having an output conforming to a cosine square function.

34. A modulator and demodulator apparatus in which a signal is communicated in a plurality of main channels for a plurality of main data and a secondary channel for secondary data obtained by frequency division, comprising:
    modulation means for modulating and transmitting main data and secondary data; and
    demodulation means for receiving and demodulating a receive signal to reproduce a plurality of main data and secondary data, said demodulation means including a plurality of main data demodulation means equal in number to a number of main channels for digitally demodulating the receive signal to reproduce main data of the main channels, and secondary data demodulation means for digitally demodulating the receive signal to reproduce secondary data of the secondary channel;
    each of said main data demodulation means comprising:
        demodulation processing means for digitally demodulating the receive signal and producing a digital demodulation signal;
        digital roll-off filter means for applying band separation processing to the digital demodulation signal from said demodulation processing means;
        timing phase extraction means for extracting a timing phase from the digital demodulation signal from said demodulation processing means;
        timing phase discrimination means for discriminating a timing phase from the timing phase extracted by said timing phase extraction means; and
        timing phase jumping digital control filter means provided for offsetting the timing phase by an amount in accordance with a result of timing phase discrimination from said timing phase discrimination means;
    said secondary data demodulation means comprising timing phase discrimination means for receiving, as an input signal thereto, a demodulation vector signal sampled into a digital value and discriminating to which one of a plurality of regions of a discrimination plane a phase of the input signal belongs, said timing phase discrimination means for inputting, as an input for processing of a next processing stage, a rotation vector obtained by rotating the demodulation vector signal and producing a rotated demodulation vector signal, for moving the rotated demodulation vector signal to a quadrant which includes a reference discrimination region of the discrimination plane, for performing a predetermined calculation outputting one of two binary values when the rotated demodulation vector signal is not in a reference discrimination region of the discrimination plane, for performing another calculation outputting other of the two binary values when the rotated demodulation vector signal is within the reference discrimination region of the discrimination plane, and for discriminating a timing phase of the input vector from a result of one of the predetermined calculation and the another calculation.

35. A modulation and demodulation method for modulating and transmitting data by modulation means and demodulating a receive signal by demodulation means to reproduce the data, comprising the steps of:
    a) receiving, by the demodulation means, as an input signal, a demodulation vector signal sampled into a digital value;
    b) rotating the demodulation vector signal and producing a rotated demodulation vector signal;
    c) moving the rotated demodulation vector signal to a quadrant which includes a reference discrimination region of a discrimination plane;
    d) performing a predetermined calculation to output one of two binary values when the rotated demodulation vector signal is not in the reference discrimination region of the discrimination plane;
    e) performing a different calculation to output other of the two binary values when the rotated demodulation vector signal is in the reference discrimination region of the discrimination plane; and
    f) determining a timing phase of the rotated demodulation vector signal from a result of one of the predetermined calculation and the different calculation.

* * * * *

UNITED STATES PATENT AND TRADEMARK OFFICE
CERTIFICATE OF CORRECTION

PATENT NO. : 5,559,799
DATED : September 24, 1996
INVENTOR(S) : Hiroyasu MURATA, et al.

It is certified that error appears in the above-indentified patent and that said Letters Patent is hereby corrected as shown below:

On the title page,

Item [73], Title Page - change "Kanagawa" to --Kawasaki--.

Col. 2, line 48, change "cost" to --$\cos\theta$--.

Col. 3, line 28, after "It is" insert --a--.

Col. 12, line 22, change "member" to --number--.

Col. 32, line 40, delete "-".

Signed and Sealed this

Fourth Day of March, 1997

Attest:

BRUCE LEHMAN

Attesting Officer

Commissioner of Patents and Trademarks